(12) United States Patent
Miura

(10) Patent No.: US 10,037,168 B2
(45) Date of Patent: Jul. 31, 2018

(54) MEMORY MODULE AND INFORMATION PROCESSING SYSTEM

(71) Applicant: HITACHI, LTD., Chiyoda-ku, Tokyo (JP)

(72) Inventor: Seiji Miura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 83 days.

(21) Appl. No.: 15/318,498

(22) PCT Filed: Jul. 9, 2014

(86) PCT No.: PCT/JP2014/068340
§ 371 (c)(1),
(2) Date: Dec. 13, 2016

(87) PCT Pub. No.: WO2016/006067
PCT Pub. Date: Jan. 14, 2016

(65) Prior Publication Data
US 2017/0131951 A1 May 11, 2017

(51) Int. Cl.
*G06F 12/1009* (2016.01)
*G06F 3/06* (2006.01)

(52) U.S. Cl.
CPC .......... *G06F 3/0659* (2013.01); *G06F 3/0616* (2013.01); *G06F 3/0685* (2013.01);
(Continued)

(58) Field of Classification Search
CPC ......... G06F 12/1009; G06F 2212/1036; G06F 2212/205; G06F 2212/651; G06F 3/0616;
(Continued)

(56) References Cited

U.S. PATENT DOCUMENTS

2008/0215800 A1* 9/2008 Lee .................. G06F 3/0613
711/103
2008/0235467 A1 9/2008 Tagawa
(Continued)

FOREIGN PATENT DOCUMENTS

JP 2008-242503 A 10/2008
JP 2009-524145 A 6/2009
(Continued)

*Primary Examiner* — Yaima Rigol
(74) *Attorney, Agent, or Firm* — Miles & Stockbridge P.C.

(57) ABSTRACT

A memory module includes: a first memory device that is volatile or non-volatile; a second memory device that is non-volatile; a third memory device that is non-volatile; and a controller that controls the first to third memory devices, wherein a capacity of the second memory device is larger than a capacity of the first memory device, and a capacity of the third memory device is larger than the capacity of the second memory device, a second upper limit value of the number of rewritings of the second memory device is larger than a third upper limit value of the number of rewritings of the third memory device, and a first upper limit value of the number of rewritings of the first memory device is larger than the second upper limit value of the number of rewritings of the second memory device, and the controller accesses the second memory device with reference to a first address translation table related to the second memory device stored in the first memory device, and accesses the third memory device with reference to a second address translation table related to the third memory device stored in the second memory device.

15 Claims, 12 Drawing Sheets

(52) U.S. Cl.
CPC .. *G06F 12/1009* (2013.01); *G06F 2212/1036* (2013.01); *G06F 2212/205* (2013.01); *G06F 2212/651* (2013.01)

(58) Field of Classification Search
CPC ... G06F 3/0659; G06F 3/0685; G06F 12/0246
See application file for complete search history.

(56) References Cited

U.S. PATENT DOCUMENTS

| | | |
|---|---|---|
| 2009/0089486 A1 | 4/2009 | Cheung et al. |
| 2009/0300269 A1* | 12/2009 | Radke ................. G06F 12/0246 711/103 |
| 2011/0191523 A1* | 8/2011 | Caulkins ............. G06F 12/0868 711/103 |
| 2012/0072801 A1 | 3/2012 | Takeuchi et al. |
| 2013/0198439 A1 | 8/2013 | Kurotsuchi et al. |
| 2014/0025865 A1 | 1/2014 | Marukame et al. |
| 2016/0011782 A1* | 1/2016 | Kurotsuchi ............. G06F 12/16 711/104 |
| 2016/0179403 A1* | 6/2016 | Kurotsuchi ........... G06F 3/0617 711/114 |

FOREIGN PATENT DOCUMENTS

| | | |
|---|---|---|
| JP | 2012-38233 A | 2/2012 |
| JP | 2013-152676 A | 8/2013 |
| JP | 2014-021752 A | 2/2014 |

\* cited by examiner

FIG. 4

P-GLPT

| U-LAD [18:0] | D-PAD [23:2] | D-PAD[1:0]=3,2,1,0 ||
|---|---|---|---|
| | | GP-PAD | MLAoffset0 |
| 0_0000 | 0_0000 | 0_0008 | 0 |
| 0_0001 | 0_0001 | 7_FFFF | 2 |
| 0_0002 | 0_0002 | 1_0004 | 7 |
| ⋮ | ⋮ | ⋮ | ⋮ |
| 7_FFFF | 7_FFFF | 0_0058 | 9 |

P-GPLT

| GP-PAD (P-PAD[32:14]) | D-PAD [23:2] | D-PAD[1:0]=3,2,1,0 ||
|---|---|---|---|
| | | U-LAD(3B) | VLE_FG(1B) |
| 0_0000 | 8_0000 | 00_0044 | 00 |
| 0_0001 | 8_0001 | 05_3201 | 05 |
| 0_0002 | 8_0002 | 02_5600 | 01 |
| ⋮ | ⋮ | ⋮ | ⋮ |
| 7_FFFF | F_FFFF | 00_0001 | 05 |

P-WCT1 for F-LPT

| GP-PAD (P-PAD[32:14]) | D-PAD [23:2] | D-PAD[1:0]=3,2,1,0 |
|---|---|---|
| | | LPT-WCT(4B) |
| 0_0000 | 10_0000 | 0000_0133 |
| 0_0001 | 10_0001 | 0000_0163 |
| 0_0002 | 10_0002 | 0000_0140 |
| ⋮ | ⋮ | ⋮ |
| 7_FFFF | 17_FFFF | 0000_0124 |

P-INV for F-LPT

| ENTRY | GP-PAD (P-PAD[32:14]) |
|---|---|
| 0 | 0_0100 |
| 1 | 0_0102 |
| 2 | 0_0257 |
| ⋮ | ⋮ |
| 1023 | 0_0322 |

P-WCT2 for F-PLT

| F-PAD [32:14] | D-PAD [23:2] | D-PAD[1:0]=3,2,1,0 |
|---|---|---|
| | | PLT-WCT2(4B) |
| 0 | 1F_0000 | 0000_0133 |
| 1 | 1F_0001 | 0000_0163 |
| 2 | 1F_0002 | 0000_0140 |
| ⋮ | ⋮ | ⋮ |
| 7_FFFF | 26_FFFF | 0000_0124 |

P-WCT3 for F-WCT

| F-PAD [32:21] | D-PAD [23:2] | D-PAD[1:0]=3,2,1,0 |
|---|---|---|
| | | PLT-WCT3(4B) |
| 000 | 27_0000 | 0000_0133 |
| 001 | 27_0001 | 0000_0163 |
| 002 | 27_0002 | 0000_0140 |
| ⋮ | ⋮ | ⋮ |
| FFF | 27_0FFF | 0000_0124 |

WBUF0/1

| ENTRY | D-PAD[23:3] | D-PAD[2:0]=7,6,5,4,3,2,1,0 ||
|---|---|---|---|
| 0 | 13_8000 | LAD[32:4] = 0020_0100 | F-PAD[32:4] = 001D_0000 |
| | 13_8001 TO 13_8400 | DATA(8kB) = D0 ||
| 1 | 13_8401 | LAD[32:4] = 0020_0120 | F-PAD[32:4] = 001D_0001 |
| | 13_8402 TO 13_8801 | DATA(8kB) = D1 ||
| ⋮ | ⋮ | ⋮ ||
| 255 | 17_7C00 | LAD[32:4] = 0021_3401 | F-PAD[32:4] = 001D_00FF |
| | 17_7C01 TO 17_8000 | DATA(8kB) = D255 ||

FIG. 5

F-LPT

| GP-PAD [32:14] | M-LAD LAD[13:4] | P-PAD [31:13] | P-PAD [12:3] | P-PAD[2:0]=7,6,5,4,3,2,1,0 ||
|---|---|---|---|---|---|
| | | | | F-PAD[32:4] | P-WCT |
| 0_0000 | 000 | 0_0000 | 000 | 0000_0240 | 0000_0200 |
| | ⋮ | | ⋮ | ⋮ | ⋮ |
| | 3FF | | 3FF | 0000_2101 | 0000_0220 |
| 0_0001 | 000 | 0_0001 | 000 | 0030_1205 | 0 |
| | ⋮ | | ⋮ | ⋮ | ⋮ |
| | 3FF | | 3FF | 0030_4590 | 2 |
| ⋮ | ⋮ | ⋮ | ⋮ | ⋮ | ⋮ |
| 7_FFFF | 000 | 7_FFFF | 000 | 0001_0554 | 0 |
| | ⋮ | | ⋮ | ⋮ | ⋮ |
| | 3FF | | 3FF | 0001_3672 | 2 |

F-PLT

| F-PAD [32:4] | P-PAD [32:2] | P-PAD[1:0]=3,2,1,0 ||
|---|---|---|---|
| | | LAD[32:4] | VLE_FG[2:0] |
| 0000_0000 | 4000_0000 | 0_000_0044 | 0_0_0 |
| 0000_0001 | 4000_0001 | 05_3201 | 05 |
| 0000_0002 | 4000_0002 | 02_5600 | 01 |
| ⋮ | ⋮ | ⋮ | ⋮ |
| 1FFF_FFFF | 5FFF_FFFF | 00_0001 | 05 |

F-WCT

| F-BLKAD F-PAD[32:11] | P-PAD [32:2] | P-PAD[1:0]=3,2,1,0 ||
|---|---|---|---|
| | | F-WCT(3byte) | EFP |
| 00_0000 | C000_0000 | 0133 | 1_0_0 |
| 00_0001 | C000_0001 | 00_0163 | 0_1_0 |
| 00_0002 | C000_0002 | 00_0140 | 1_0_0 |
| ⋮ | ⋮ | ⋮ | ⋮ |
| 3F_FFFF | C03F_FFFF | 00_0124 | 0_0_1 |

MEMORY MODULE AND INFORMATION PROCESSING SYSTEM

TECHNICAL FIELD

The present invention relates to a memory module and an information processing system using the same.

BACKGROUND ART

In recent years, solid state drives (SSDs) configured with a plurality of NAND flash memories and a controller have been used in storage systems, server devices, laptop PCs, and the like. In the NAND flash memory, there is an upper limit in the number of erasures, and the number of erasures is known to be a factor determining the lifespan of an SSD.

PTL 1 discloses a semiconductor memory device configured with a NAND flash memory, a non-volatile buffer memory, and a memory control unit. Write data input to the semiconductor memory device is first written in a non-volatile buffer memory and then written in the NAND flash memory.

PTL 2 discloses a semiconductor memory device configured with a non-volatile memory, a RAM, and a controller. An address translation table is stored in the non-volatile memory, and a part of the address translation table is stored in the RAM.

CITATION LIST

Patent Literature

PTL 1: Japanese Patent Application Laid-Open No. 2014-021752

PTL 2: Japanese Patent Application Laid-Open No. 2013-152676

SUMMARY OF INVENTION

Technical Problem

The inventors have carried out studies on the lifespan of the NAND flash memory. The NAND flash memory has pursued a smaller memory cell, a multi-value data storage system, and a greater capacity. The memory cell of the NAND flash memory includes two transistors each of which includes a charge accumulation layer (floating gate electrode) formed above a semiconductor substrate with a tunnel insulation film interposed therebetween and a control gate electrode stacked over the charge accumulation layer with an inter-gate insulation film interposed therebetween.

A high voltage is applied between the control gate electrode and the semiconductor substrate, electrons are transferred into and from the floating gate electrode via the tunnel insulation film, and thus a threshold voltage $V_{th}$ of the transistor is changed. An operation of injecting electrons into the floating gate electrode is called a program, and the threshold voltage $V_{th}$ is increased by the program. On the other hand, an operation of ejecting the electrons of the floating gate electrode is called an erasure operation, and the threshold voltage $V_{th}$ is decreased by the erasure operation. In this regard, by controlling an amount of charges accumulated in the floating gate electrode, the threshold voltage $V_{th}$ of the memory cell is controlled such that data is stored based on a difference in the threshold voltage. For example, data of two values is stored such that a state in which the threshold voltage $V_{th}$ is high is stored as data "0," and a state in which the threshold voltage $V_{th}$ is low is stored as data "1." Recently, a write threshold voltage distribution is segmented, and multi-value storage such as 4-value or 8-value storage is also performed. When data is written in the memory cell of the NAND flash memory, it is necessary to erase data in advance.

When the program operation and the erasure operation are repeated, the tunnel insulation film of the memory cell suffers electric field damage, and defects are gradually increased. Then, the electrons accumulated in the floating gate electrode escape through the defects in the tunnel oxide film, the threshold voltage $V_{th}$ is changed, and it is finally unable to write and read data.

Further, in the NAND flash memory, a program disturb in which writing is performed in a memory cell other than a writing target occurs. In the NAND flash memory, when data is written in the memory cell, about 18 V is applied to a control gate, 0 V is applied to a silicon (Si) substrate, and 10 V is applied to a control gate of a non-selected cell. On the other hand, in order to prevent erroneous writing from being performed in non-selected cells belonging to the same word line, it is necessary to apply a voltage of about 8 V to the Si substrate of the memory cell. As a result, stress of about 10 V is applied to a memory cell of a non-writing target adjacent to the memory cell of the writing target at the time of programming, and the program disturb occurs.

Further, in the NAND flash memory, when data of a certain memory cell is read many times, a read disturb in which data stored in memory cells in the same page is rewritten occurs. In the NAND flash memory, when data is read from a certain memory cell, as a read voltage, 0 V is applied to a selected cell, and 4.5 V is applied to a non-selected cell. In other words, in the NAND flash memory, a voltage is applied to a memory cell in which reading is not performed as well. For this reason, recorded data disappears little by little, and the threshold voltage is changed little by little.

This problem is more severe in multi-value storage such as 4-value or 8-value storage in which memory cells are scaled down to increase the capacity of the NAND flash memory, and the write threshold voltage distribution is segmented. In other words, with the increase in the capacity of the NAND flash memory, and the upper limit value of the number of data writings or the number of erasures is decreased, and thus the lifespan is reduced.

In addition, the inventors have carried out studies on the SSD. The SSD is configured with a RAM, a NAND flash memory, and a controller that controls the RAM and the NAND flash memory, RAM temporarily stores data serving as a writing target as a buffer memory and stores an address translation table. In order to level the number of rewritings of the memory cells, the controller in the SSD performs wear leveling so that an upper limit value of the number of rewritings in the memory cell of the NAND flash memory is not exceeded. In order to perform the wear leveling, an address translation table in which a logical address input to the SSD is associated with a physical address of the NAND flash memory is necessary.

Further, when the RAM is a volatile memory, if power is shut down, data stored in the RAM disappears, and reliability of the SSD is lowered. In this regard, in order to cope with the power shutdown, buffer data and the address translation table of the NAND flash memory are stored in a non-volatile memory. In this case, there are cases in which due to the capacity and the upper limit of the number of rewritings of the used non-volatile memory, the lifespan of the SSD affects and reduces the lifespan of the non-volatile memory in which the buffer data and the address translation table of the NAND flash memory are stored as well as the lifespan of the NAND flash memory. However, such problems are not mentioned in PTLs 1 and 2 at all.

The present invention was made in light of the foregoing, and objects and new features of the present invention will be apparent from the description and the appended drawings of the present specification.

Solution to Problem

A disclosed memory module includes: a first memory device that is volatile or non-volatile; a second memory device that is non-volatile; a third memory device that is non-volatile; and a controller that controls the first to third memory devices, wherein a capacity of the second memory device is larger than a capacity of the first memory device, and a capacity of the third memory device is larger than the capacity of the second memory device, a second upper limit value of the number of rewritings of the second memory device is larger than a third upper limit value of the number of rewritings of the third memory device, and a first upper limit value of the number of rewritings of the first memory device is larger than the second upper limit value of the number of rewritings of the second memory device, and the controller accesses the second memory device with reference to a first address translation table related to the second memory device stored in the first memory device, and accesses the third memory device with reference to a second address translation table related to the third memory device stored in the second memory device.

Advantageous Effects of Invention

A disclosed memory module can have a long lifespan.

BRIEF DESCRIPTION OF DRAWINGS

FIG. 4 is a diagram illustrating an example of an address translation table.

FIG. 5 is a diagram illustrating an example of an address translation table.

DESCRIPTION OF EMBODIMENTS

Hereinafter, modes of carrying the present invention will be described using embodiments.

First Embodiment (Overview of Information Processing System)

Figure 1:
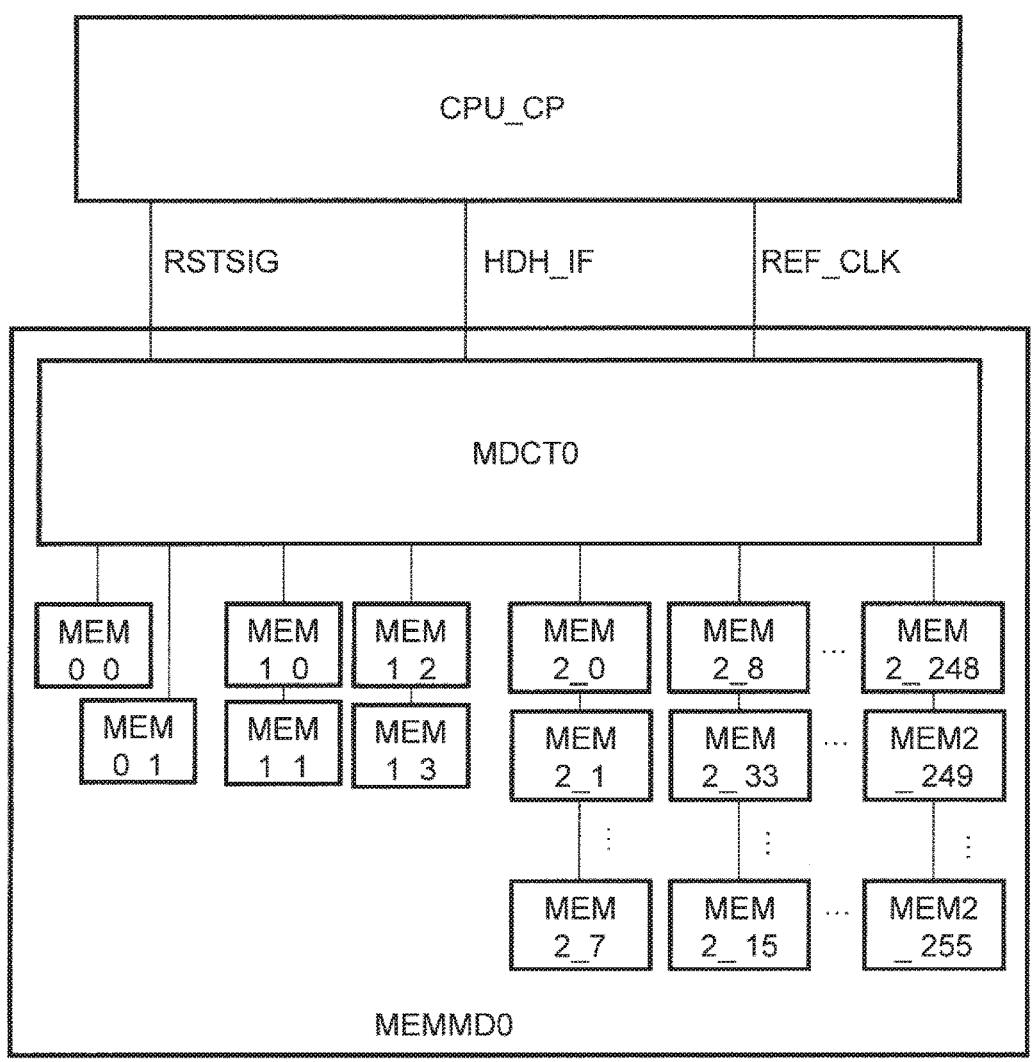
FIG. 1 is a block diagram illustrating an exemplary configuration of an information processing system according to a first embodiment.

FIG. 1 is a block diagram illustrating an exemplary schematic configuration of an information processing system according to the present embodiment. The information processing system illustrated in FIG. 1 includes an information processing device (processor) CPU_CP and a memory module MEMMD0. The information processing device CPU_CP is a host controller that manages, for example, data stored in the memory module MEMMD0 using a logical address (LAD) of a 512 byte unit. The information processing device CPU_CP reads or writes data from or in the memory module MEMMD0 through an interface signal HDH_IF. The memory module MEMMD0 corresponds to, for example, a solid state drive (SSD) or the like.

Examples of a signaling scheme of connecting the information processing device CPU_CP with the memory module MEMMD0 include a serial interface signaling scheme, a parallel interface signaling scheme, and an optical interface signaling scheme, and any one of these signaling schemes is used. Examples of a clocking scheme of operating the information processing device CPU_CP and the memory module MEMMD0 include a common clocking scheme, a source synchronous clocking scheme, and an embedded clocking scheme in which clock information is embedded in a data signal, and any one of these clocking schemes is used.

In the present embodiment, the following operation will be described under the assumption that the serial interface signaling scheme and the embedded clocking scheme are be used.

For example, a read request (RQ) or a write request which includes clock information embedded therein and is converted into serial data is input from the information processing device CPU_CP to the memory module MEMMD0 through the interface signal HDH_IF. The read request (RQ) includes the logical address (LAD), a data read command (RD), a sector count (SEC), and the like, and the write request includes the logical address (LAD), a data write command (WRT), the sector count (SEC), write data (WDATA), and the like.

An overview of the memory module MEMMD0 will be described. The memory module MEMMD0 includes memory devices MEM0 (denoted by M0_0 and MEM0_1, and hereinafter, "M00 and MEM01"), MEM1 (denoted by M1_0 to MEM1_3, and hereinafter, M10 to MEM13), and MEM2_0 to MEM2_255 and a control circuit (controller) MDCT0 that controls the memory devices.

The memory device MEM0 is a volatile or non-volatile memory device, and the memory device MEM1 and the memory devices MEM2_0 to MEM2_255 are non-volatile memory devices. For example, a DRAM is used as the volatile memory device, and a memory device such as a NAND flash memory, a NOR flash memory, a phase change memory (PCM), a resistive random access memory (Re-RAM), a spin transfer torque magnetic random access memory (STT-MRAM), or a ferroelectric memory is selectively used as the non-volatile memory device. As the non-volatile memory device, there are an overwritable memory device and a memory device in which data is written after an erasure operation. The following description will proceed with an example of the memory device in which data is written after an erasure operation.

In the memory module MEMMD0, the capacities of the respective memory devices are configured such that the capacity of the memory device MEM1 is larger than the capacity of the memory device MEM0, and the capacities of the memory devices MEM2_0 to MEM2_255 are larger than the capacity of the memory device MEM1. Numerical number examples of the capacities of the memory devices will be described.

The memory device commonly has a limitation to the number of rewritings. In this regard, the memory module MEMMD0 is configured by selecting a memory device in which the limit value (the upper limit value) of the number of rewritings of the memory device MEM1 is larger than the limit value (the upper limit value) of the number of rewritings of the memory devices MEM2_0 to MEM2_255, and the limit value (the upper limit value) of the number of rewritings of the memory device MEM0 is larger than the limit value (the upper limit value) of the number of rewritings of the memory device MEM1. Further, in order to implement the wear leveling of the memory device MEM1 and the memory devices MEM2_0 to MEM2_255, the number-of-rewritings table of the memory device MEM1 is set up in the memory device MEM0, and the number-of-rewritings table of the memory devices MEM2_0 to MEM2_255 is set up in the memory device MEM1.

The controller MDCT0 accesses (writes or reads data in or from) the memory device MEM1 using the address translation table stored in the memory device MEM0, and accesses the memory devices MEM2_0 to MEM2_255 using the address translation table stored in the memory device MEM1. An offset for the physical address in the memory device MEM1 is set in the address translation table stored in the memory device MEM0. The controller MDCT0 performs the wear leveling of the address translation table stored in the memory device MEM1 using the number-of-rewritings table of the memory device MEM1 and the number-of-rewritings table of the memory devices MEM2_0 to MEM2_255.

The controller MDCT0 writes write data to be written from the information processing device CPU_CP to the memory module MEMMD0 in a write buffer included in the memory device MEM0, gives a notification indicating completion of writing to the information processing device CPU_CP, and writes the data written in the write buffer in a predetermined region in the memory devices MEM2_0 to MEM2_255. The controller MDCT0 decides a physical address indicating the predetermined region in the memory devices MEM2_0 to MEM2_255 in which the data written in the write buffer is stored, and stores the data at the decided physical address. The controller MDCT0 updates the address translation table that is stored in the memory device MEM1 and used for accessing the memory devices MEM2_0 to MEM2_255 using the decided physical address. The controller MDCT0 performs a series of pipeline process including (1) writing data in the write buffer included in the memory device MEM0, (2) deciding the physical address in the memory devices MEM2_0 to MEM2_255 in which the data is written, (3) storing data at the decided physical address in the memory devices MEM2_0 to MEM2_255, and (4) updating the address translation table that is stored in the memory device MEM1 and used for accessing the memory devices MEM2_0 to MEM2_255.

The memory module MEMMD0 will be specifically described. The memory device MEM0 stores an address translation table P-GLPT, an address translation table P-GPLT, a number-of-writings table P-WCT, and a physical address enable/disable table P-VLT which are related to the memory device MEM1, and the memory device MEM0 is also equipped with a write buffer WBUF that stores the write data transmitted from the information processing device CPU_CP. The respective tables will be described later.

The memory device MEM1 stores an address translation table F-LPT, an address translation table F-PLT, a number-of-writings table F-WCT, a physical address enable/disable table F-VLT, SDD configuration information SDCFG, and an address map ADMAP which are related to the memory devices MEM2_0 to MEM2_255, and further stores a boot program BTP of the information processing device CPU_CP and the memory module MEMMD0. The respective tables and the boot program will be described later.

The memory devices MEM2_0 to MEM2_255 store data, an operating system (OS), an application program, and the like which are used by the information processing device CPU_CP.

Here, the information processing device CPU_CP recognizes that the memory module MEMMD0 is a memory module capable of storing data of 3.6 TB, and thus a logical address (LAD[32:0]) for storing data of 3.6 TB is input from the information processing device CPU_CP to the memory module MEMMD0. Logical addresses LAD[3:0], LAD[13:4], and LAD[32:14] are indicated by S-LAD, M-LAD, and U-LAD. A total capacity of the memory devices MEM2_0 to MEM2_255 is assumed to 4 TB, and an address in the memory devices MEM2_0 to MEM2_255 is a physical address (F-PAD[32:0]) for storing data of a 4 TB capacity. Each of the memory devices MEM2_0 to MEM2_255 is a memory device having a capacity of 16 Gbits. A numerical value related to the memory capacity including an example to be described below is an example.

The address translation table F-LPT is a table indicating a physical address (P-PAD) in the memory devices MEM2_0 to MEM2_255 at which data corresponding to the logical address (LAD) included in the read request (RQ) or the write request which is input from the information processing device CPU_CP to the memory module MEMMD0 is stored.

The number-of-writings table F-WCT stores the number of erasures of each block having a size of 1 MB among the 4 TB capacity of the memory devices MEM2_0 to MEM2_255.

The physical address enable/disable table F-VLT is a table indicating whether the physical address (F-PAD) is enabled or disabled.

The address translation table F-PLT is a table indicating the logical address (LAD) corresponding to data stored at the physical address (F-PAD) in the memory devices MEM2_0 to MEM2_255. The address translation table P-GLPT stored in the memory device MEM0 is a table indicating a physical address (GP-PAD) of the memory device MEM1 at which the address translation table F-LPT is stored.

The address translation table P-PLT is a table indicating the logical address (U-LAD) corresponding to data stored at the physical address (GP-PAD) in the memory device MEM1.

The number-of-writings table P-WCT stores the number of erasures of each physical address (GP-PAD).

The physical address enable/disable table P-VLT is a table indicating whether the physical address (GP-PAD) is enabled or disabled.

The write buffer WBUF can stores data corresponding to 256 logical addresses at the logical address LAD of 8 KB. The data input from the information processing device CPU_CP is first stored in the write buffer WBUF and then stored at the physical address F-PAD in the memory devices MEM2_0 to MEM2_255 designated by the control circuit (controller) MDCT0.

The control circuit MDCT0 selects the physical address F-PAD and write data so that the number of rewritings of the physical address F-PAD in the memory devices MEM2_0 to MEM2_255 is leveled. Further, the control circuit MDCT0 selects the physical address GP-PAD and writes data so that the number of rewritings of the physical address GP-PAD in the memory device MEM1 is leveled.

The information processing device CPU_CP reads data, the OS, or the application program from the memory module MEMMD0, and executes the data, the OS, or the application program. The information processing device CPU_CP writes an execution result in the memory module MEMMD0.

Immediately after electric power is supplied, the memory module MEMMD0 performs an initialization operation (power-on resetting) for initializing the memory devices MEM2_0 to MEM2_255, the memory device MEM0, the memory device MEM1, and the control circuit MDCT0 therein. Further, even when a reset signal RSTSIG is received from the information processing device CPU_CP, the memory module MEMMD0 initializes the memory devices MEM2_0 to MEM2_255, the memory device MEM0, the memory device MEM1, and the control circuit MDCT0 therein.

Figure 2:
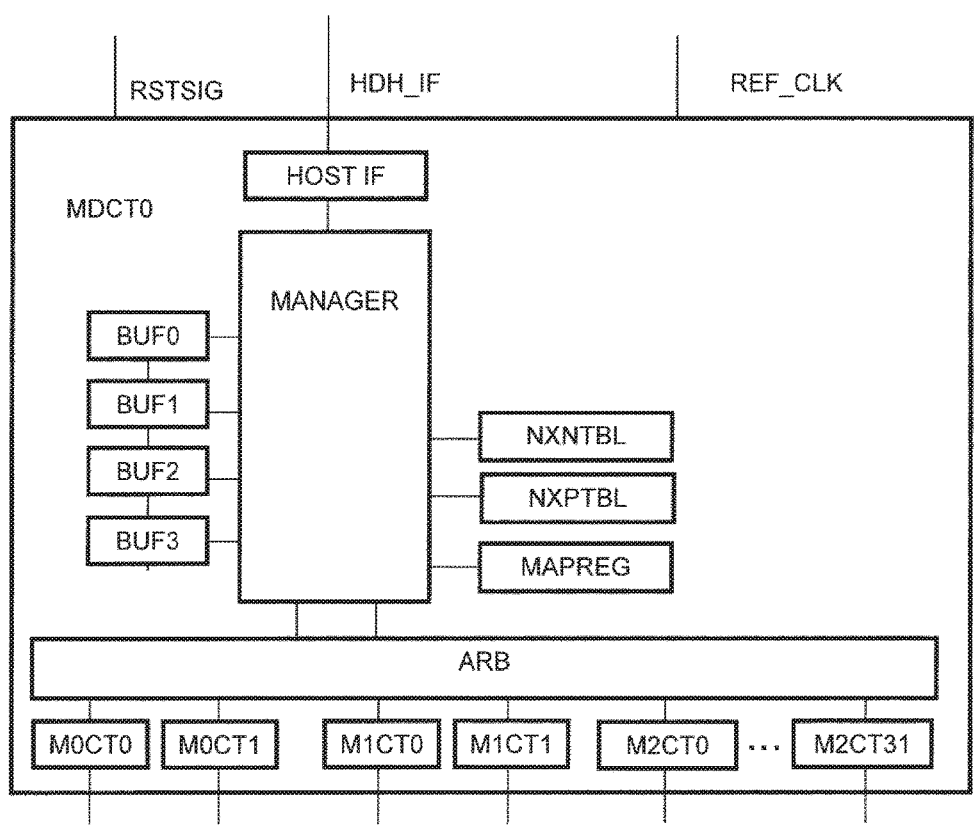
FIG. 2 is a block diagram illustrating an exemplary configuration of a control circuit in an information processing system.

FIG. 2 is a block diagram illustrating an exemplary configuration of the control circuit MDCT0 of FIG. 1. The control circuit MDCT0 illustrated in FIG. 2 includes an interface circuit HOST_IF, buffers BUF0 to BUF3, writing physical address tables NXNTBL and NXPTBL, an arbitration circuit ARB, an information processing circuit MANAGER, memory control circuits M0CT0, M0CT1, M1CT0, M1CT1, and M2CT0 to M2CT31, and a map register MAPREG.

The memory control circuit M0CT0 accesses the memory device MEM0 and controls the memory device MEM0. The memory control circuit M1CT0 accesses the memory device MEM1 and controls the memory device MEM1.

The memory control circuit M2CTi (i=0 to 31) accesses and controls the memory devices MEM2_$i$×8 to MEM2_$i$×8+7. For example, the memory control circuit M2CT0 (i=0) accesses the memory device MEM2_0 to MEM2_7 and controls the memory device MEM2_0 to MEM2_7, the memory control circuit M2CT1 (i=1) accesses the memory devices MEM2_8 to MEM2_15 and controls the memory devices MEM2_8 to MEM2_15, and the memory control circuit M2CT31 (i=31) accesses the memory devices MEM2_248 to MEM2_255 and controls the memory devices MEM2_248 to MEM2_255.

The writing physical address table NXNTBL is a table that stores the physical address F-PAD allocated to the logical address when a write command accompanied by the logical address is received next from the information processing device CPU_CP, and the map register MAPREG is a register that holds information related to a memory space region of the entire memory module MEMMD0 (a storage region of allocation information of each region, for example the address translation table).

The buffers BUF0 to BUF3 temporarily store the write data or the read data of the memory devices MEM2_0 to MEM2_255.

The arbitration circuit ARB transmits the read/write command and data from the information processing circuit MANAGER to the memory control circuits M0CT0, M1CT0, and M2CT0 to M2CT32.

Figure 3:
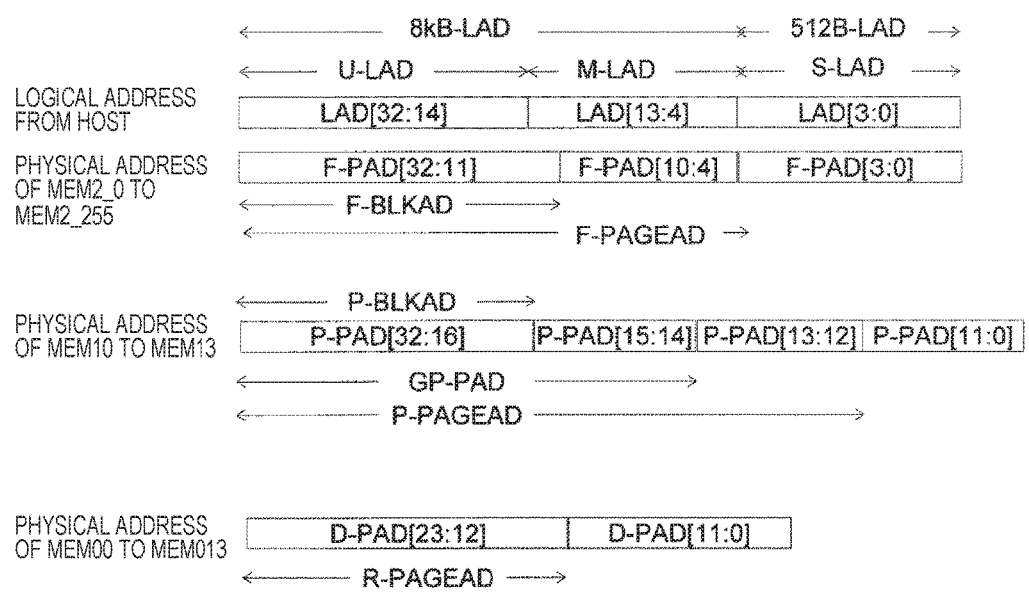
FIG. 3 is a diagram illustrating an example of an address correspondence.

FIG. 3 illustrates an example of addresses to be allocated to control memory devices MEM0 (denoted by MEM00 and MEM01 or MEM0_0 and MEM0_1), MEM10 to MEM13 (or MEM1_0 to MEM1_3), and MEM2_0 to MEM2_255 through the control circuit MDCT0 of the memory module MEMMD0 of FIG. 1.

Each of the memory devices MEM2_0 to MEM2_255 has a capacity of 16 GB, a page size is 8 kB, a block size is 1 MB, and an upper limit of the number of erasures of each block is 3000. A total capacity of the memory devices MEM2_0 to MEM2_255 is 4 TB, and the address F-PAD allocated from the control circuit MDCT0 to the memory devices MEM2_0 to MEM2_255 is F-PAD[32:0]. F-PAD [32:11] corresponds to a block address F-BLKAD, F-PAD [32:4] corresponds to a page address F-PAGEAD of an 8 kB unit, and F-PAD[32:0] corresponds to a sector address F-SECAD of a 512 B unit.

Each of the memory devices MEM10 to MEM13 has a capacity of 2 GB, and an upper limit of the number of writings is one million times. A total capacity of the memory devices MEM10 to MEM13 is 8 GB. The address P-PAD allocated to the memory devices MEM10 to MEM13 by the control circuit MDCT0 is P-PAD[32:0]. P-PAD[32:16] corresponds to a block address P-BLKAD of a 128 kB unit, P-PAD[32:12] corresponds to a page address P-PAGEAD of a 4 kB unit, P-PAD[11:0] corresponds to an address in a page of a 4 KB, and P-PAD[32:0] corresponds to a byte address P-BYTEAD of a 1 B unit. An upper limit of the number of writings is one million times.

Each of the memory devices MEM0_0 and MEM0_1 has a capacity of 8 MB, and an upper limit of the number of writings is one hundred million times. A total capacity of the memory devices MEM00 and MEM01 is 16 MB. An address R-PAD allocated to the memory devices MEM0_0 and MEM0_1 by the control circuit MDCT0 is R-PAD[23:0]. R-PAD[23:12] corresponds to a page address R-PAGEAD of a 4 kB unit, and R-PAD[23:0] corresponds to a byte address R-BYTEAD of a 1 B unit.

An address translation table P-GLPT, an address translation table P-PLT, number-of-writings tables P-WCT1, P-WCT2, and P-WCT3, a physical address disable table P-INV, and write buffers WBUF0 and WBUF1 which are stored in the memory devices MEM0_0 to MEM0_1 will be described with reference to FIG. 4.

The address translation table P-GLPT is a table indicating a physical address GP-PAD (P-PAD[32:14]) in the memory devices MEM10 to MEM13 at which the address translation table F-LPT is stored, and stores the physical address GP-PAD (P-PAD[32:14]) and the offset MLADodffset for a logical address U-LAD[18:0] (LAD[32:14]) transmitted from the information processing device CPU_CP.

00_0000 to 07_FFFF of a physical address D-PAD[23:2] in the memory devices MEM0_0 and MEM0_1 correspond to 00_0000 to 07_FFFF of a logical address U-LAD[18:0], data of 32 bits (4 bytes) can be stored at each address, MLAoffset is stored in lower 10 bits, and the physical address GP-PAD (P-PAD[32:14]) is stored in upper 22 bits.

The physical address GP-PAD is an address input to the address translation table F-LPT held in the memory devices MEM1_0 to MEM1_3, and the physical address GP-PAD includes 1024 physical addresses F-PAD[32:4] in the memory devices MEM1_0 to MEM1_3 and the number of writings P-WCT of each physical address F-PAD[32:4].

The offset MLADodffset is prepared so that the wear leveling is effectively performed for the 1024 physical addresses F-PAD stored at the physical address GP-PAD of the address translation table F-LPT held in the memory devices MEM1_0 to MEM1_3. The wear leveling of the memory devices MEM10 to MEM13 will be described in detail with reference to FIGS. 10 and 11.

Since each of the physical address F-PAD[32:4] and the number of writings P-WCT has a size of 4 bytes, the physical address GP-PAD includes data of 8 KB (=1024×8 B).

In other words, the physical address GP-PAD is an address obtained by delimiting the memory devices MEM1_0 to MEM1_3 in data size units of 8 KB, and the address translation table P-GLPT is a table that translates the logical address U-LAD into the physical address GP-PAD in data size units of 8 KB.

A capacity of the address translation table P-GLPT will be described. The physical address GP-PAD corresponding to the logical address U-LAD[18:0] is stored in the address translation table P-GLPT. The logical address U-LAD is a 19-bit address, and there are 262143 addresses. The translated physical address GP-PAD has a 19-bit address as well. The offset MLADodffset has a size of 10 bits since the 1024 physical addresses F-PAD in the memory devices MEM1_0 to MEM1_3 are included in the physical address GP-PAD. Thus, data of 29 bits is stored in one logical address U-LAD. As a result, 1048572 bytes (=262143×4 B) are preferably prepared as the capacity of the address translation table P-GLPT.

When the memory devices MEM1_0 to MEM1_3 can perform writing in data units of 1 B, the address translation table F-LPT can translate the logical address LAD into the physical address GP-PAD theoretically in data units of 1 B through the address translation table P-GLPT, but the capacity of the address translation table P-GLPT is explosively increased.

In this regard, by performing translation from the logical address U-LAD into the physical address GP-PAD, for example, in data size units of 8 KB even in the memory device in which writing can be performed in data units of 1 B, it is possible to significantly reduce a capacity necessary for the address translation table P-GLPT and reduce the cost of the memory module MEMMD0.

For example, when the memory devices MEM1_0 to MEM1_3 have page sizes of various data units such as 512 B, 4 KB, 8 kB, and 16 kB, and data is written, by performing translation from logical address U-LAD into the physical address GP-PAD in data size units of page sizes, it is possible to significantly reduce a capacity necessary for the address translation table P-GLPT and reduce the cost of the memory module MEMMD0.

The address translation table P-GPLT is a table indicating the logical address U-LAD corresponding to data stored in the physical address GP-PAD in the memory devices MEM10 to MEM13, and stores the logical address U-LAD and an enable/disable flag VLE_FG corresponding to the physical address GP-PAD.

8_0000 to F_FFFF of the physical address D-PAD[23:2] correspond to 00_0000 to 07_FFFF of the physical address GP-PAD, data of 4 bytes can be stored at each address, the enable/disable flag VLE_FG is stored in a lower 1 bit, and the logical address U-LAD is stored in upper 3 bits. The enable/disable flag VLE_FG corresponding to GP-PAD has 1-byte information, indicates enable when VLE_FG[2] in VLE_FG[7:0] is 1 and disable when VLE_FG[2] in VLE_FG[7:0] is 0, and indicates an erased or disable state when VLE_FG[1:0] is 3, write after erasing when VLE_FG[1:0] is 2, overwrite when VLE_FG[1:0] is 1, and don't care when VLE_FG[1:0] is 0. The capacity of the address translation table P-GPLT is 1048572 bytes (=262143×4 B) which is equal to that of the address translation table P-GPLT.

The number-of-writings table P-WCT1 is a table indicating the number of erasures or the number of writings of each physical address P-PAD[32:14] in regards to the address translation table F-LPT stored in the memory devices MEM10 to MEM13. 10_0000 to 17_FFFF of the physical address D-PAD[23:2] correspond to 00_0000 to 07_FFFF of the physical address P-PAD[32:14], and the number of erasures or the number of writings LPT-WCT having a size of 4 bytes is stored at each address.

The number-of-writings table P-WCT2 is a table indicating the number of erasures or the number of writings of each physical address F-PAD[32:14] in regards to the address translation table F-PLT stored in the memory devices MEM10 to MEM13. 1F_0000 to 26_FFFF of the physical address D-PAD[23:2] correspond to 00_0000 to 07_FFFF of the physical address F-PAD[32:14], and the number of erasures or the number of writings PLT-WCT2 having a size of 4 bytes is stored at each address.

The number-of-writings table P-WCT3 is a table indicating the number of erasures or the number of writings of each physical address F-PAD[32:21] in regard to the number-of-writings table F-WCT stored in the memory devices MEM10 to MEM13. 27_0000 to 27_0FFF of the physical address D-PAD[23:2] correspond to 00_000 to FFF of the physical address F-PAD[32:21], and the number of erasures or the number of writings PLT-WCT3 having a size of 4 bytes is stored at each address.

The disable address table P-INV stores 1024 disabled physical addresses GP-PAD.

The write buffer WBUF includes two write buffers WBUF0 and WBUF1 and stores the write data transmitted from the information processing device CPU_CP, and 256 pieces of 8-kB data (entries ENTRY0 to ENTRY255) can be stored in one write buffer WBUF. Further, the logical address LAD[32:4] corresponding to each piece of 8-kB data and the physical address F-PAD[32:4] serving as a write address in the memory devices MEM2_0 to MEM2_255 are stored in the write buffer WBUF. One entry includes write data of 8 kB, a logical address LAD[32:4] of 4 B, and a physical address F-PAD[32:4] of 4 B, and has a size of 8200 bytes. A physical address D-PAD[23:3] is an address of an 8 byte unit and indicates a start address and an end address of each entry.

The entry ENTRY0 includes 13_8000 to 13_8400 of the physical address D-PAD[23:3], the physical addresses LAD[32:4] and F-PAD[32:4] are stored at 13_8000, and data of 8 kB is stored at 13_8001 to 13_8400.

A start address of the entry ENTRY1 is an address obtained by adding 0401 to a start address 13_0000 of the entry ENTRY0 and has a similar configuration to the entry ENTRY0.

The other entries have a similar configuration, and an address obtained by adding 0401 serving as a hexadecimal number to a start address of an immediately previous entry is a start address of a next entry. Finally, the entry ENTRY255 includes 17_7C00 to 17_800 serving as the physical address D-PAD[23:3], the logical address LAD[32:4] and the physical address F-PAD[32:4] are stored at 17_7C00, and data of 8 kB is stored at 17_7C01 to 17_8000.

Each of the write buffers WBUF0 and WBUF1 has a size of 2099200 bytes (=256 entries×8200 bytes).

It will be appreciated that even when the memory devices MEM1_0 to MEM1_3 are memory devices in which the erasure operation is necessary, it is possible to construct an address translation table P-GLPT, an address translation table P-PLT, number-of-writings tables P-WCT1, P-WCT2, and P-WCT3, a physical address disable table P-INV, and write buffers WBUF0 and WBUF1 which are similar.

The address translation table F-LPT, the address translation table F-PLT, the number of writings table F-WCT stored in the memory devices MEM10 to MEM13 will be described with reference to FIG. 5.

The address translation table F-LPT is a table indicating the physical address F-PAD[32:4] in the memory devices MEM2_0 to MEM2_255 at which the write data transmitted from the information processing device CPU_CP is stored.

The control circuit MDCT0 stores the physical address F-PAD[32:4] related to the memory devices MEM2_0 to MEM2_255 and the number of writings P-WCT of each physical address F-PAD[32:4] in the memory devices MEM1_0 to MEM1_3.

The physical addresses P-PAD[31:13] and P-PAD[12:3] in the memory devices MEM1_0 to MEM1_3 correspond to the physical address GP-PAD and a logical address M-LAD (LAD[13:4]) transmitted from the information processing device CPU_CP.

A value of the physical address F-PAD[32:4] is stored in upper 4 bytes of the physical address P-PAD[31:3] designated by the physical address GP-PAD and the logical address M-LAD, and a value of the number of writings P-WCT is stored in lower 4 bytes.

The physical address F-PAD[32:4] related to the memory devices MEM2_0 to MEM2_255 is managed in data size units of 8 KB through the address translation table F-LPT.

The physical address GP-PAD is an address for the logical address U-LAD[18:0] (LAD[32:14]) and translated through the address translation table P-GLPT stored in the memory devices MEM0_0 and MEM0_1.

In the address translation table F-LPT stored in the memory devices MEM1_0 to MEM1_3, the physical address GP-PAD translated from the logical address U-LAD in data size units of 8 KB through the address translation table P-GLPT stored in the memory devices MEM0_0 and MEM0_1 is managed, and the 1024 physical addresses F-PAD[32:4] and the number of writings P-WCT of each physical address F-PAD[32:4] are included in the physical address GP-PAD.

When the memory devices MEM1_0 to MEM1_3 can perform writing in data units of 1 B, the address translation table F-LPT can translate the logical address LAD into the physical address GP-PAD theoretically in data units of 1 B through the address translation table P-GLPT, but the capacity of the address translation table P-GLPT is explosively increased. In this regard, by performing translation from the logical address U-LAD into the physical address GP-PAD, for example, in data size units of 8 KB even in the memory device in which writing can be performed in data units of 1 B, it is possible to significantly reduce a capacity necessary for the address translation table P-GLPT and reduce the cost of the memory module MEMMD0.

The address translation table F-PLT is a table indicating the logical address LAD[32:4] corresponding to data stored at the physical address F-PAD in the memory devices MEM2_0 to MEM2_255, and stores the logical address LAD[32:4] and the enable/disable flag VLE_FG corresponding to the physical address F-PAD[32:4].

4000_0000 to 5FFFF_FFFF of the physical address P-PAD[32:2] correspond to 0000_0000 to 1FFF_FFFF of the physical address F-PAD[32:4], data of 4 bytes can be stored at each address, the enable/disable flag VLE_FG is stored in lower 3 bits, and the logical address LAD[32:4] is stored in upper 29 bits.

The enable/disable flag VLE_FG indicates enable when VLE_FG[2] in the enable/disable flag VLE_FG[2:0] is 1 and disable when VLE_FG[2] is 0, and indicates erased when VLE_FG[1:0] is 3, write after erasing when VLE_FG[1:0] is 2, overwrite when VLE_FG[1:0] is 1, and don't care when VLE_FG[1:0] is 0.

The number-of-writings table F-WCT is a table that stores the number of erasures or the number of writings F-WCT (3 bytes) of each block address F-BLKAD (F-PAD[32:11]) in the memory devices MEM2_0 to MEM2_255 and an erased flag EFP (1 byte).

C000_0000 to C03F_FFFF of the physical address P-PAD[32:2] in the memory devices MEM10 to MEM13 correspond to 00_0000 to 03_FFFF of the block address F-BLKAD, and the number of erasures or the number of writings F-WCT having a size of 3 bytes and the erased flag EFP having a size of 1 byte are stored at each address. The erased flag EFP of 4 indicates that a corresponding block is erased, the erased flag EFP of 2 indicates that data is written at all addresses in a corresponding block, and the erased flag EFP of 1 indicates that data is written at some addresses in a corresponding block.

A capacity of the address translation table F-LPT will be described. A total capacity of the memory devices MEM2_0 to MEM2_255 is 4 TB, and the control circuit MDCT0 manages the capacity of 4 TB using the physical address F-PAD[32:0] of a 512 B unit. The information processing device CPU_CP recognizes the memory module MEMMD0 as a memory module capable of storing data of 3.2 TB and manages the memory module MEMMD0 using the logical address (LAD) of the 512 byte unit.

The number of logical addresses LAD is 687947680, and when the control circuit MDCT0 performs translation between the physical address F-PAD and the 687947674 logical addresses in page data units of 8 kB, the number of addresses that can be stored in the address translation table F-LPT is 429496730 (=687947680/16). For this reason, the physical address F-PAD to be translated is also indicated by the physical address F-PAD[32:4] of a page unit of 8 KB, and the number of bytes is 4 B (32 bits) or less. In each of the memory devices MEM10 to MEM13, when an upper limit of the number of rewritings is set to one million times, the number of bytes necessary for indicating the upper limit of the number of rewritings is 3 bytes or less.

In order to effectively perform the wear leveling of the memory devices MEM10 to MEM13 and increase the lifespan of the memory module MEMMD0, the control circuit MDCT0 holds the number of rewritings (table which is hereinafter not necessarily indicated by "table") P-WCT for each physical address F-PAD[32:4] stored in the memory devices MEM10 to MEM13. The wear leveling of the memory devices MEM10 to MEM13 will be described in detail with reference to FIGS. 10 and 11. As a result, the capacity of the address translation table F-LPT is preferably prepared by 3435973840 bytes (=429496730×(4 B+4 B)).

The capacity of the address translation table F-PLT will be described. A total capacity of the memory devices MEM2_0 to MEM2_255 is 4 TB, and the control circuit MDCT0 manages the capacity of 4 TB using the physical address F-PAD[32:0] of a 512 B unit. The number of physical addresses P-PAD is 8589934592, and when the control circuit MDCT0 performs translation between the physical address F-PAD and the 8589934592 logical addresses in page data units of 8 kB, the number of addresses that can be stored in the address translation table F-PLT is 53687091 (=8589934592/16). For this reason, the physical address F-PAD to be translated is also indicated by the physical address F-PAD[32:4] of a page unit of 8 KB, and the number of bits is 29 bits. The enable/disable flag VLE_FG corresponding to the physical address F-PAD[32:4] has 3-bit information. As a result, the capacity of the address translation table F-PLT is preferably prepared by 2147483648 bytes (=53687091×4 B).

A capacity of the number-of-writings table F-WCT will be described. The number of block addresses F-BLKAD (F-PAD[32:11]) stored in the number-of-writings table F-WCT is 4194303. Since each block has data of 4 bytes, the capacity of the number-of-writings table F-WCT is preferably prepared by 16777212 bytes (=4194303×4 B). The capacity of the address translation table F-LPT is decided according a data size unit in which translation from the logical address into the physical address F-PAD is performed. For example, when translation between the physical address F-PAD and the logical address is performed in a data unit of 16 KB, the capacity of the address translation table F-LPT is decreased to be 1717986920 bytes (=3435973840 bytes×8 B/16 B). When a data size unit LPTDsize when translation from the logical address into the physical address F-PAD is performed is increased, the size of the address translation table F-LPT and the cost of the memory module MEMMD0 can be reduced.

However, the data size unit LPTDsize is larger than an average write data size per write request from the information processing device CPU_CP, and the number of updates, that is, the number of rewritings of the address translation table F-LPT is increased, and thus the lifespan of the address translation table F-LPT is reduced. In other words, the lifespan of the memory module MEMMD0 is reduced. The data size unit LPTDsize in which translation from the logical address into the physical address is performed is preferably set to a value in which both of the low cost and the long lifespan of the memory module MEMMD0 are considered.

Figure 6:
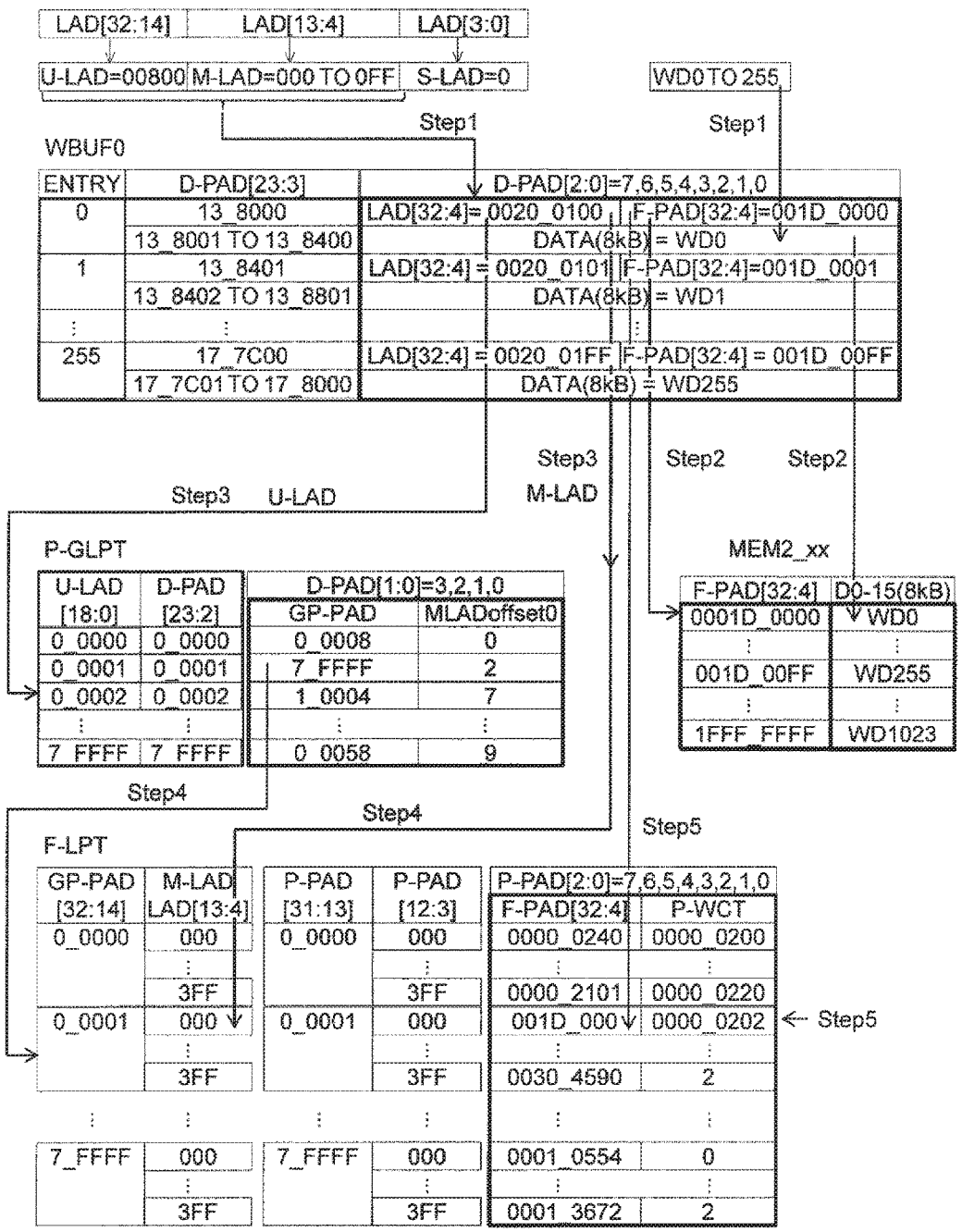
FIG. 6 is a flow diagram illustrating an example of a data writing method.

FIG. 6 illustrates an operation in which the control circuit (controller) MDCT0 writes data in the memory devices MEM2_0 to MEM2_255 in response to the write request transmitted from the information processing device CPU_CP.

The memory device MEM0 includes the write buffer WBUF0 that stores the write data transmitted from the information processing device CPU_CP and can store 256 pieces of 8-KB data (the entries ENTRY0 to ENTRY255). The logical address LAD[32:4] corresponding to each piece of 8-kB data and the physical address F-PAD[32:4] serving as the write address in the memory devices MEM2_0 to MEM2_255 are stored in the write buffer WBUF. The write buffer WBUF1 has a similar configuration to that of the write buffer WBUF0.

One entry includes write data of 8 kB, a logical address LAD[32:4] of 4 B, and a physical address F-PAD[32:4] of 4 B, and has a size of 8200 bytes. A physical address D-PAD[23:3] is an address of an 8 byte unit and indicates a start address and an end address of each entry.

The entry ENTRY0 includes 13_8000 to 13_8400 of the physical address D-PAD[23:3], the physical addresses LAD [32:4] and F-PAD[32:4] are stored at 13_8000, and data of 8 kB is stored at 13_8001 to 13_8400.

An initial value of the physical address F-PAD[32:4] is set to the entries ENTRY0 to ENTRY255 of the write buffer WBUF0 by the control circuit MDCT0 immediately after the memory module MEMMD0 is powered on.

256 write commands WRT, the logical address LAD[32:0], and the write data of 8 kB (data WD0 to WD255) are sequentially input from the information processing device CPU_CP to the control circuit MDCT0. The control circuit MDCT0 stores the logical address LAD[32:4] and the write data WD0 to WD255 in the entries 0 to 255 of the write buffer WBUF0 (Step1).

Then, the control circuit MDCT0 sequentially reads the value of the physical address F-PAD[32:4] and the write data (data WD0 to WD255) stored in the entries 0 to 255 of the write buffer WBUF0, and sequentially writes the data WD0 to WD255 at the same address of the devices MEM2_0 to MEM2_255 as the value of the memory physical address F-PAD[32:4] (Step2).

Then, the control circuit MDCT0 reads a value of the logical address LAD[32:4] from the entry 0 of the write buffer WBUF0, and extracts a value of the upper logical address LAD[32:14] of the value of the logical address LAD[32:4], that is, a value of the logical address U-LAD and a value of the lower logical address LAD[13:4], that is, a value of the logical address M-LAD (Step3).

The logical address U-LAD is the same as the physical address D-PAD[23:2] in the memory device MEM0, and the address translation table P-GLPT is stored in a region of the physical address D-PAD[23:0].

Then, the control circuit MDCT0 reads the physical address GP-PAD in the memory devices MEM10 to MEM13 from the physical address D-PAD in the memory device MEM0 corresponding to the value of the logical address U-LAD (Step4).

The physical address GP-PAD corresponds to the physical address P-PAD[31:13] in the memory devices MEM10 to MEM13, the logical address M-LAD corresponds to the physical address P-PAD[12:3], and the address translation table F-LPT is stored in the physical address P-PAD[31:3] designated by the physical address GP-PAD and the logical address M-LAD.

Specifically, the physical address F-PAD[32:4] in the memory devices MEM2_0 to MEM2_255 and the number-of-rewritings value P-WTC for the physical address P-PAD[31:3] in the memory devices MEM10 to MEM13 are stored in the address translation table F-LPT.

Then, the control circuit MDCT0 updates the address translation table F-LPT. Specifically, the control circuit MDCT0 reads the physical address F-PAD[32:4] stored in the entries 0 to 255 of the write buffer WBUF0, and writes the physical address F-PAD[32:4] at the physical address P-PAD[32:3] of the address translation table F-LPT designated by the physical address GP-PAD read in Step4 and the logical address M-LAD. Further, the control circuit MDCT0 updates a value obtained by adding 1 to the current number-of-rewritings value of the physical address P-PAD[32:3] as a new number-of-rewritings value P-WTC (Step5).

Further, the control circuit MDCT0 updates the number-of-writings table P-WCT1. Specifically, the control circuit MDCT0 updates the number-of-writings table P-WCT1 by calculating a value obtained by adding 1 to the current number of writings value corresponding to the physical address GP-PAD (P-PAD[32:14]) read in Step4 from the number-of-writings table P-WCT1 stored in the memory device MEM0 as a new number-of-rewritings value LPT- WTC (Step5. Not illustrated in FIG. 6). As described above, the address translation table F-LPT stored at the physical address P-PAD[32:3] in the memory devices MEM10 to MEM13 is managed using the physical address GP-PAD stored in the memory device MEM0 and the logical address M-LAD, and thus it is possible to store only the physical address GP-PAD in the address translation table P-GLPT for managing the address translation table F-LPT, and it is possible to reduce the capacity of the address translation table P-GLPT.

Further, while the data of the write buffer WBUF0 is being written in the memory devices MEM2_0 to MEM2_255 in Step2, the control circuit MDCT0 calculates 256 physical addresses F-PAD[32:4] for next data writing, and stores the calculated addresses in the write buffer WBUF1 (Step6. Not illustrated in FIG. 6).

A method of calculating the physical address F-PAD through the control circuit MDCT0 will be described below. The control circuit MDCT0 reads the number-of-erasures value of each physical block address F-BLKAD in the erased state in the memory devices MEM2_0 to MEM2_255 from a number-of-erasures table F-WCT (Step1), and compares the number-of-erasures value with a number-of-erasures threshold value ERCth. When the read number-of-erasures value is the number-of-erasures threshold value ERCth or less (Step2), the physical address F-PAD included in the physical block F-BLKAD in the erased state is stored in the write buffer WBUF0 or WBUF1 as the physical address F-PAD for next data writing (Step3). If the physical block address F-BLKAD having the number-of-erasures value which is the number-of-erasures threshold value ERCth or less is not found, a value larger than the current number-of-erasures threshold value ERCth is set as a new number-of-erasures threshold value ERCth (Step4), and Step1 to Step3 are repeated using the new number-of-erasures threshold value ERCth. The operation of Step1 to Step4 is repeated until the number of physical addresses F-PAD stored in the write buffer WBUF0 or WBUF1 reaches 256.

As described above, the physical address F-PAD of the physical block address F-BLKAD in the erased state having the number-of-erasures value which is the number-of-erasures threshold value ERCth or less is set as the physical address F-PAD for next data writing, and thus the number of erasures of the memory devices MEM2_0 to MEM2_255 is leveled, and the lifespan of the memory module MEMMD0 is increased.

Further, the 256 physical addresses F-PAD[32:4] for next writing are calculated in advance and stored in the write buffer WBUF1, and thus it is possible to complete data writing preparation for writing next write data from the information processing device CPU_CP to the memory devices MEM2_0 to MEM2_255, and it is possible to implement high-speed writing.

Figure 7:
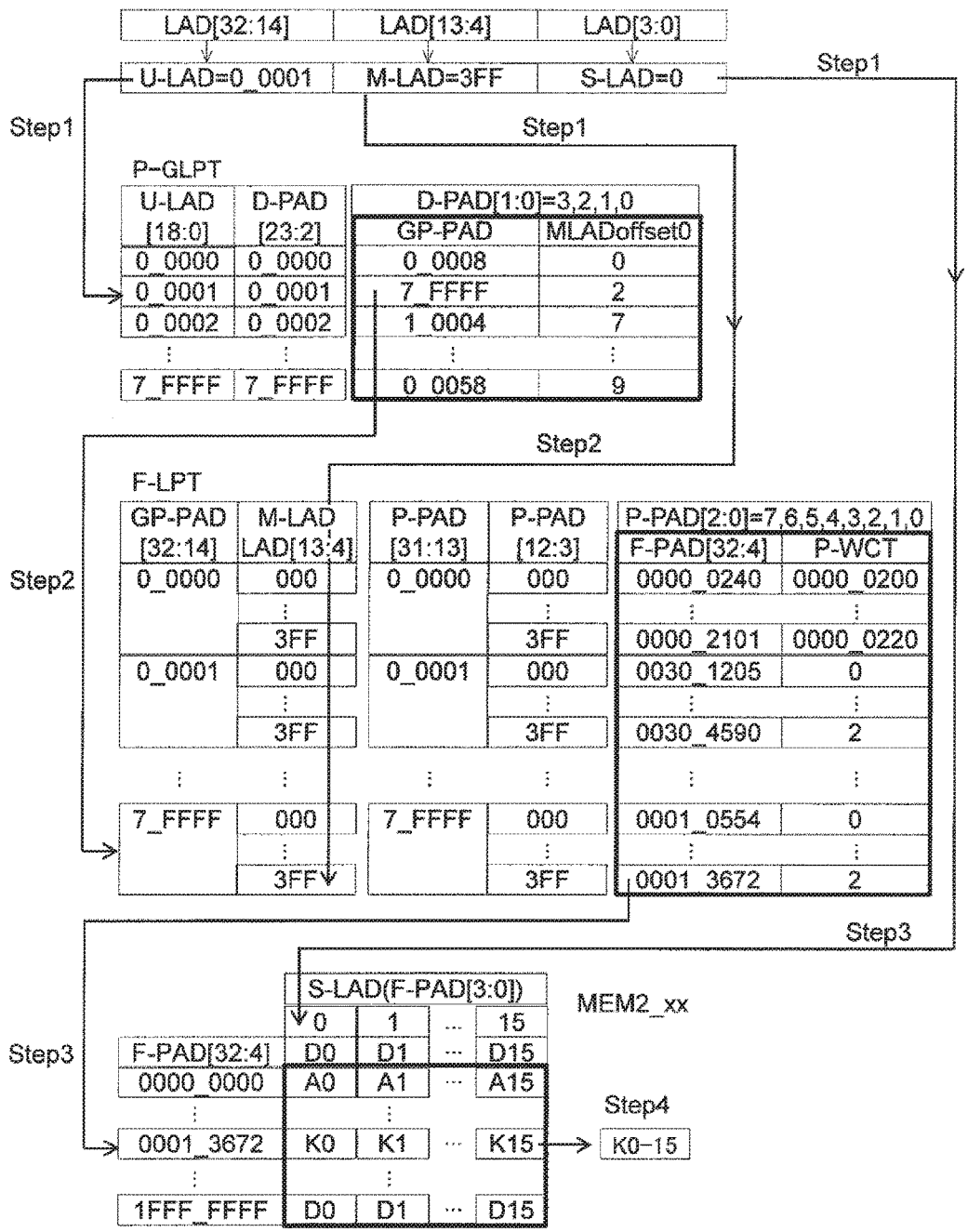
FIG. 7 is a flow diagram illustrating an example of a data reading method.

FIG. 7 illustrates an operation in which the control circuit (controller) MDCT0 reads data from the memory devices MEM2_0 to MEM2_255 in response to a read request from the information processing device CPU_CP. A command RD for reading data of 8 KB and logical address LAD[32:0] are sequentially input from the information processing device CPU_CP to the control circuit MDCT0.

The control circuit MDCT0 reads a value of the logical address LAD[32:0], and extracts a value of the logical address LAD[32:14], a value of the logical address LAD[13:4], and a value of the logical address LAD[3:0], that is, a value of the logical address U-LAD, a value of the logical address M-LAD, and a value of the logical address S-LAD (Step1). Then, the control circuit MDCT0 reads the physical address GP-PAD of the address translation table F-LPT from the physical address D-PAD corresponding to the value of the logical address U-LAD in the address translation table P-GLPT (Step2).

Then, the control circuit MDCT0 reads the physical address F-PAD[32:4] in the memory devices MEM2_0 to MEM2_255 from the physical address GP-PAD read in Step2 and the physical address P-PAD[32:3] designated by the logical address M-LAD extracted in Step1 in the address translation table F-LPT stored in the memory devices MEM10 to MEM13 (Step3).

Then, the control circuit MDCT0 reads data of 8 KB from the physical address F-PAD[32:4] in the memory devices MEM2_0 to MEM2_255 read in Step3 and the physical address F-PAD[32:0] designated by the logical address S-LAD extracted in Step1 (Step4).

Since the control circuit MDCT0 can perform Step1, Step2, Step3, and Step4 as the pipeline operation, even when the read requests are consecutively generated from the information processing device CPU_CP, reading can be performed at a high speed. For example, when four read requests RD0, RD1, RD2, and RD3 are consecutively transmitted from the information processing device CPU_CP to the memory module MEMMD0, the control circuit MDCT0 can perform Step3 for the read request RD1 while performing Step4 for the read request RD0. Further, it is possible to perform Step2 for the read request RD2 while performing Step3 for the read request RD1, and it is possible to perform Step1 for the read request RD3 while performing Step2 for the read request RD2.

A pipeline operation in the memory module MEMMD0 when a plurality of read and write requests are input from the information processing device CPU_CP to the memory module MEMMD0 will be described with reference to FIG. 8.

First, a pipeline operation illustrated in FIG. 8 when the read requests RD0, RD1, RD2, and RD3 of 8-KB data are input to the memory module MEMMD0 will be described. When a read command Rd and the value of the logical address LAD[32:0] are included in each of the read requests RD0, RD1, RD2, and RD3, and the read requests RD0, RD1, RD2, and RD3 of 8-KB data are input from the information processing device CPU_CP to the memory module MEMMD0, the control circuit MDCT0 extracts the logical address U-LAD (LAD[32:14]), the logical address M-LAD (LAD[13:4]), and the logical address S-LAD (LAD[3:0]) from the logical address LAD[32:0] of each of the read requests RD0, RD1, RD2, and RD3 (Step1 in FIG. 7 and Step1: t0 to t4 in FIG. 8).

Figure 8:
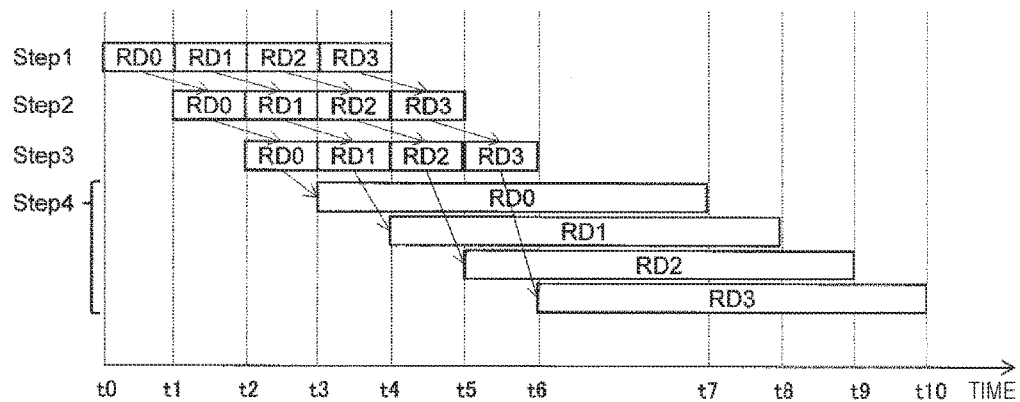
FIG. 8 is a diagram illustrating an example of a data reading method.

Then, the control circuit MDCT0 reads the physical address GP-PAD of the address translation table F-LPT stored at the physical address D-PAD corresponding to the logical address U-LAD of each of the read requests RD0, RD1, RD2, and RD3 in the address translation table P-GLPT (Step2 in FIG. 7 and Step2: t1 to t5 in FIG. 8). Then, the control circuit MDCT0 reads the physical address F-PAD[32:4] in the memory devices MEM2_0 to MEM2_255 stored at the physical address GP-PAD read in Step2 in FIG. 7 and the physical address P-PAD[32:3] designated by the logical address M-LAD extracted in Step1 in FIG. 7 in the address translation table F-LPT stored in the memory devices MEM10 to MEM13 (Step3 in FIG. 7 and Step3: t2 to t6 in FIG. 8).

Then, the control circuit MDCT0 reads data of 8 KB from the physical address F-PAD[32:4] in the memory devices MEM2_0 to MEM2_255 read in Step3 in FIG. 7 and the physical address F-PAD[32:0] designated by the logical address S-LAD extracted in Step1 in FIG. 7 (Step4 in FIG. 7 and Step4: t3 to t10 in FIG. 8).

As described above, when a plurality of reads are input from the information processing device CPU_CP to the memory module MEMMD0, the control circuit MDCT0 can perform Step1 to Step4 as the pipeline operation and read data at a high speed.

A pipeline operation in the memory module MEMMD0 when a plurality of write requests WT0, WT01, WTD2, and WT3 are input from the information processing device CPU_CP to the memory module MEMMD0 will be described with reference to FIG. 9. 256 write commands WRT, the logical address LAD[32:0], and 8-kB write data (the data WD0 to WD255) are included in each of the write requests WT0, WT1, WT2, and WT3.

Figure 9:
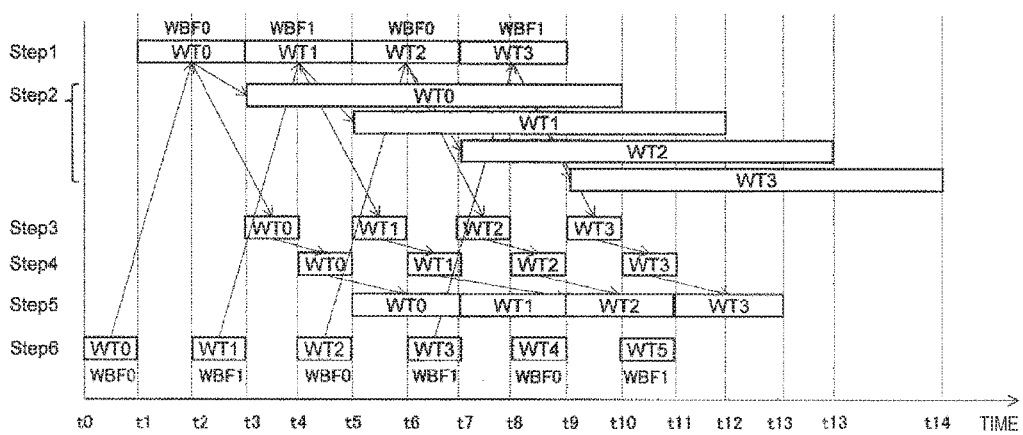
FIG. 9 is a diagram illustrating an example of a data writing method.

First, at a time t0, when the memory module MEMMD0 is initially powered on, the control circuit MDCT0 calculates 256 physical addresses F-PAD[32:4] for the next data write request and stores the calculated 256 physical addresses F-PAD[32:4] in the write buffer WBUF0 (Step6 in FIG. 6 and Step6: times t0 to t1 in FIG. 9).

Then, the write request WT0 is input to the memory module MEMMD0, that is, the 256 write commands WRT, the logical address LAD[32:0], and the 8-kB write data (the data WD0 to WD255) are sequentially input to the control circuit MDCT0. The control circuit MDCT0 sequentially stores the logical address LAD[32:4] and the write data WD0 to WD255 in the entries 0 to 255 of the write buffer WBUF0 in which the 256 physical addresses F-PAD[32:4] are stored (Step1 in FIG. 6 and Step1: times t1 to t3 in FIG. 9).

Further, while data of the write buffer WBUF0 is being written in the memory devices MEM2_0 to MEM2_255 in Step1, the control circuit MDCT0 calculates the 256 physical addresses F-PAD[32:4] for the next data write request WT1 and stores the 256 physical addresses F-PAD[32:4] in the write buffer WBUF1 (Step6 in FIG. 6 and Step6: times t2 to t3 in FIG. 9).

Then, the control circuit MDCT0 sequentially reads the value of the physical address F-PAD[32:4] and the write data (the data WD0 to WD255) stored in the entries 0 to 255 of the write buffer WBUF0, and sequentially writes the data WD0 to WD255 at the same addresses of the devices MEM2_0 to MEM2_255 as the value of the memory physical address F-PAD[32:4] (Step2 in FIG. 6 and Step2: times t3 to t10 in FIG. 9).

Then, the control circuit MDCT0 reads the value of the logical address LAD[32:4] in the entries 0 to 255 of the write buffer WBUF0, and extracts the value of the upper logical address LAD[32:14] of the value of the logical address LAD[32:4], that is, the value of the logical address U-LAD and the value of the lower logical address LAD[13:4], that is, the value of the logical address M-LAD (Step3 in FIG. 6 and Step3: times t3 to t4 in FIG. 9).

Then, the control circuit MDCT0 reads the physical address GP-PAD in the memory devices MEM10 to MEM13 stored at the physical address D-PAD corresponding to the value of the logical address U-LAD in the address translation table P-GLPT in the memory device MEM0 using the logical address U-LAD read in Step3 (Step4 in FIG. 6 and Step4: times t4 to t5 in FIG. 9).

Then, the control circuit MDCT0 writes the physical address F-PAD[32:4] read in Step2 and stored in the write buffer WBUF0 at the physical address GP-PAD read in Step4 and the physical address P-PAD[32:3] of the address translation table F-LPT designated by the logical address M-LAD extracted in Step3. Further, the control circuit MDCT0 updates a value obtained by adding 1 to the current number-of-rewritings value of the physical address P-PAD [32:3] as a new number-of-rewritings value P-WTC, and calculates a value obtained by adding 1 to the current number-of-writings value corresponding to the physical address GP-PAD (P-PAD[32:14]) read in Step4 in the number-of-writings table P-WCT1 stored in the memory device MEM0 as a new number-of-rewritings value LPT-WTC and updates the number-of-writings table P-WCT1 (Step5 in FIG. 6 and Step5: times t5 to t7 in FIG. 9).

Even when the write requests WT1, WT2, and WT3 are sequentially input to the memory module MEMMD0 subsequently to the write request WT0, the control circuit MDCT0 performs a similar pipeline operation to that for the write request WT0.

At times t4 and t5, the control circuit MDCT0 calculates the 256 physical addresses F-PAD[32:4] for the next data write request WT2 (Step1: times t5 to t7 in FIG. 9) and stores the 256 physical addresses F-PAD[32:4] in the write buffer WBUF0.

At times t5 to t7, the control circuit MDCT0 calculates the 256 physical addresses F-PAD[32:4] for the next data write request WT3 (Step1: times t7 to t9 in FIG. 9) and stores the 256 physical addresses F-PAD[32:4] in the write buffer WBUF1.

Further, at times t8 and t9, the control circuit MDCT0 calculates the 256 physical addresses F-PAD[32:4] for the next data write request (Step1: after the time t9 in FIG. 9) and stores the 256 physical addresses F-PAD[32:4] in the write buffer WBUF0, and at times t10 and t11, the control circuit MDCT0 calculates the 256 physical addresses F-PAD [32:4] for the next data write request (Step1: after the time t9 in FIG. 9) and stores the 256 physical addresses F-PAD [32:4] in the write buffer WBUF1.

As described above, the control circuit MDCT0 calculates the 256 physical addresses F-PAD for next writing in advance and stores the 256 physical addresses F-PAD in the write buffers WBUF0 and WBUF1, and thus it is possible to complete data writing preparation for writing next write data from the information processing device CPU_CP to the memory devices MEM2_0 to MEM2_255, and it is possible to implement high-speed writing.

Further, the decision of the physical address F-PAD for next writing in Step6, the writing to the write buffers WBUF0 and WBUF1 in Step1, the writing operation to the devices MEM2_0 to MEM2_255 in Step2, and the update of the address translation tables P-GLPT and F-LPT in Step3 to Step5 are performed in the pipeline manner, and thus writing can be performed at a high speed.

Figure 10:
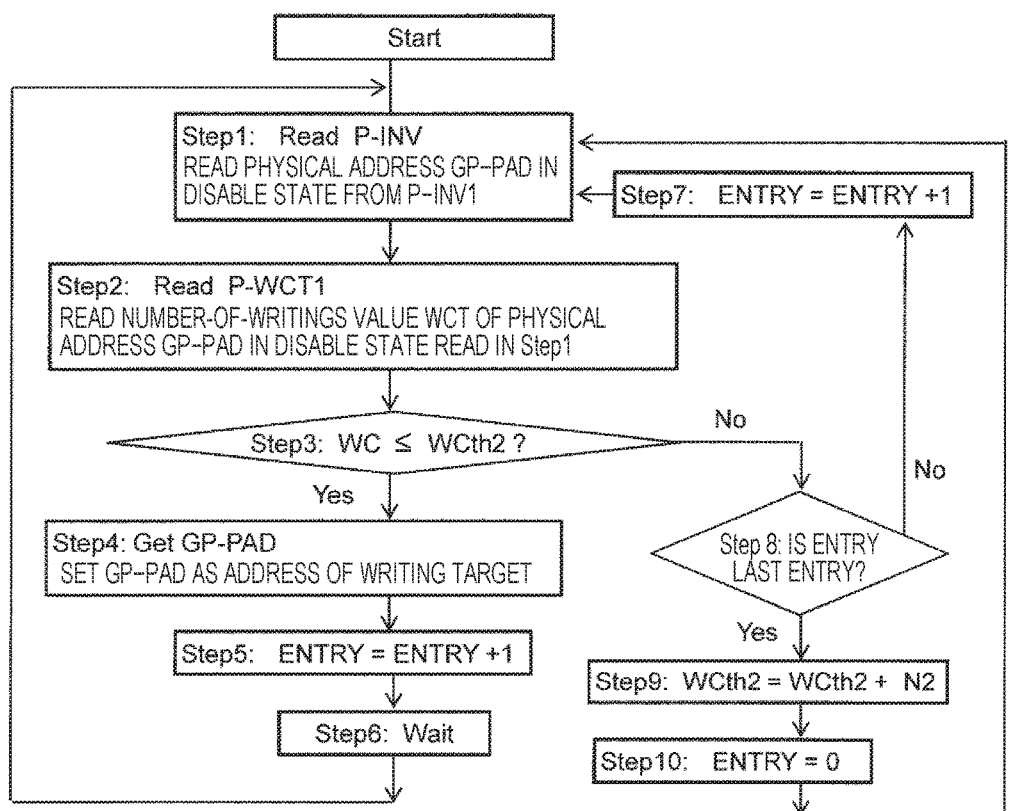
FIG. 10 is a flow diagram illustrating an example of a wear leveling method.

FIG. 10 illustrates an example of the wear leveling operation of the physical addresses GP-PAD of the address translation table F-LPT.

The control circuit MDCT0 starts the wear leveling operation for the address translation table F-LPT, for example, when an increase amount of data input to the memory module MEMMD0 exceeds a certain amount, when the read or write request is not transmitted to the memory module MEMMD0 during a certain period of time, or when garbage collection to the memory devices MEM2_0 to MEM2_255 occurs.

By setting a range of the physical address GP-PAD of the address translation table F-LPT to a range larger than a range of the logical address U-LAD, it is possible to generate a physical address GP-PAD in a disable state. For example, when the range of the physical address GP-PAD of the address translation table F-LPT is 5% larger than the range of the logical address U-LAD, the number of physical addresses GP-PAD in the disable state in the address translation table F-LPT is 5% of the total number of physical addresses GP-PAD.

A GP-PAD disable table P-INV stores the physical address GP-PAD in the disable state for each entry, and the control circuit MDCT0 first reads the physical address GP-PAD in the disable state from a 0-th entry ENTRY of the GP-PAD disable table P-INV (Step1).

Then, the control circuit MDCT0 reads the number-of-writings value WC corresponding to the physical address GP-PAD read from the GP-PAD disable table P-INV from the number-of-writings table P-WCT1 (Step2), and compares the read number-of-writings value WC with the number-of-writings threshold value WCth2 (Step3).

When the read number-of-writings value is the number-of-writings threshold value WCth2 or less, the physical address GP-PAD in the disable state is set as the physical address of the writing target (Step4).

In Step5, the entry ENTRY for when the GP-PAD disable table P-INV is searched again is obtained by ENTRY=ENTRY+1. In Step6, it is on standby until a series of wear leveling operations to be performed next is started.

In Step8, it is checked whether or not the entry ENTRY used in Step3 is the last entry ENTRY of the GP-PAD disable table P-INV. When the entry ENTRY used in Step3 is the last entry ENTRY, a value that is N2 larger than the current number-of-writings threshold value WCth2 is set as a new number-of-writings threshold value WCth2 (Step9), then the entry ENTRY is set to 0 (Step10), and Step1 is performed.

When the entry ENTRY used in Step3 is not the last entry ENTRY, the entry ENTRY for which the GP-PAD disable table P-INV is searched is obtained by ENTRY=ENTRY+1 (Step7), and Step1 is performed.

As described above, in a series of wear leveling operation, the physical address GP-PAD (P-PAD[32:13]) in which the number of writings is the number-of-writings threshold value WCth2 or less is consistently used as the physical address GP-PAD of the writing target of the address translation table F-LPT, and thus it is possible to level the number of writings of the physical addresses GP-PAD in the address translation table F-LPT and increase the lifespan of the memory module MEMMD0.

Figure 11:
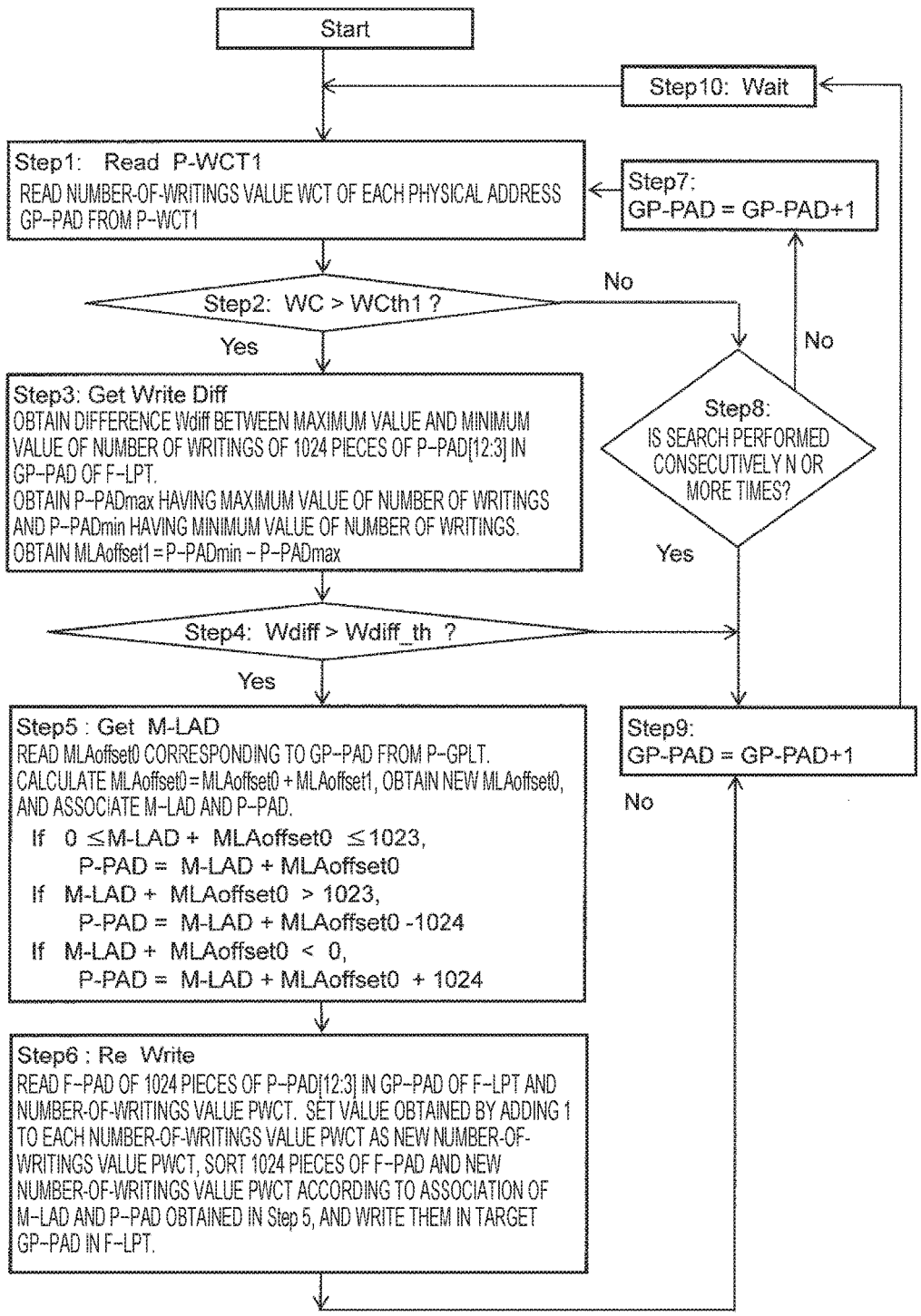
FIG. 11 is a flow diagram illustrating an example of a wear leveling method.

FIG. 11 illustrates an example of the wear leveling operation of a plurality of physical addresses P-PAD[12:3] in the physical address GP-PAD (P-PAD[32:13]) of the address translation table F-LPT.

The control circuit MDCT0 starts the wear leveling operation for the address translation table F-LPT, for example, when an increase amount of data input to the memory module MEMMD0 exceeds a certain amount, when the read or write request is not transmitted to the memory module MEMMD0 during a certain period of time, or when garbage collection to the memory devices MEM2_0 to MEM2_255 occurs.

In the wear leveling operation, first, the control circuit MDCT0 reads the number-of-rewritings value WC of the physical address GP-PAD of the address translation table F-LPT from the number-of-writings table P-WCT1 (Step1), and compares the read number-of-rewritings value WC with a number-of-rewritings threshold value WCth1 (Setp2).

When the read number-of-rewritings value is larger than the number-of-rewritings threshold value WCth1, Step3 is performed, and when the read number-of-rewritings value is the number-of-rewritings threshold value WCth1 or less, Step8 is performed. In Step3, a difference Wdiff between a maximum value and a minimum value of 1024 pieces of the number of writings included in the physical address GP-PAD (P-PAD[32:13]) of the address translation table F-LPT, P-PADmax having a maximum value of the number of writings, P-PADmin having a minimum value of the number of writings, and an offset MLAoffset1 (=P-PADmin−P-PADmax) are obtained.

In Step8, it is checked whether or not the number-of-writings table P-WCT1 is searched consecutively N or more times using the physical address GP-PAD. When the number-of-writings table P-WCT1 is searched consecutively N or more times, Step9 is performed. When the number of consecutive searches is less than N, Step7 is performed. In Step7, the physical address GP-PAD for which the number-of-writings table P-WCT1 is searched again is obtained by the physical address GP-PAD=GP-PAD+1.

After Step3, in Step4, the difference Wdiff is compared with the number-of-rewritings difference threshold value Wdiff_th. When the number-of-rewritings difference Wdiff is larger than the number-of-rewritings difference threshold value Wdiff_th, Step5 is performed, and when the number-of-rewritings difference Wdiff is the number-of-rewritings difference threshold value Wdiff_th or less, Step9 is performed. In Step5, the 1024 physical addresses P-PAD[12:3] included in the physical address GP-PAD (P-PAD[32:13]) of the address translation table F-LPT are newly associated with the logical address M-LAD. First, MLAoffset0 corresponding to the physical address GP-PAD is read from the address translation table P-GPLT. Then, MLAoffset0=MLAoffset0+MLAoffset1 is calculated, new MLAoffset0 is obtained, and the logical address M-LAD is associated with the physical address P-PAD[12:3]. An association method will be described below.

(1) If 0≤M-LAD+MLAoffset0≤1023, P-PAD=M-LAD+MLAoffset0

(2) If M-LAD+MLAoffset0>1023, P-PAD=M-LAD+MLAoffset0−1024

(3) If M-LAD+MLAoffset0<0, P-PAD=M-LAD+MLAoffset0+1024

Further, the logical address U-LAD corresponding to the physical address GP-PAD serving as a target in the address translation table P-GPLT is read. Finally, a new value of MLAoffset0 is stored in MLAoffset0 corresponding to the logical address U-LAD read from the address translation table P-GPLT in the address translation table P-GLPT.

Then, in Step6, first, the physical address F-PAD of the 1024 physical addresses P-PAD[12:3] in the target physical address GP-PAD in the address translation table F-LPT and a number-of-writings value PWCT are read. A value obtained by adding 1 to each number-of-writings value PWCT is set as a new number-of-writings value PWCT, and the 1024 physical addresses F-PAD and the new number-of-writings value PWCT are sorted according to the association of the logical address M-LAD and the physical address P-PAD[12:3] obtained in Step5 and written at the target physical address GP-PAD in the address translation table F-LPT again. In Step9, the physical address GP-PAD for which the number-of-writings table P-WCT1 is searched again is obtained by the physical address GP-PAD+1=GP-PAD+1. Then, in Step10, it is on standby until a series of wear leveling operations to be performed next is started.

As described above, in a series of wear leveling operations, the logical address M-LAD allocated to the physical address P-PAD[12:3] having the maximum value of the number of writings among the 1024 physical addresses P-PAD[12:3] included in the physical address GP-PAD (P-PAD[32:13]) of the address translation table F-LPT can be allocated to the physical address P-PAD[12:3] having the minimum value of the number of writings, and thus it is possible to level the number of writings in the address translation table F-LPT and increase the lifespan of the memory module MEMMD0. Further, through a combination with the wear leveling operation described above with reference to FIG. 10, it is possible to further increase the lifespan of the memory module MEMMD0.

Second Embodiment

Figure 12A:
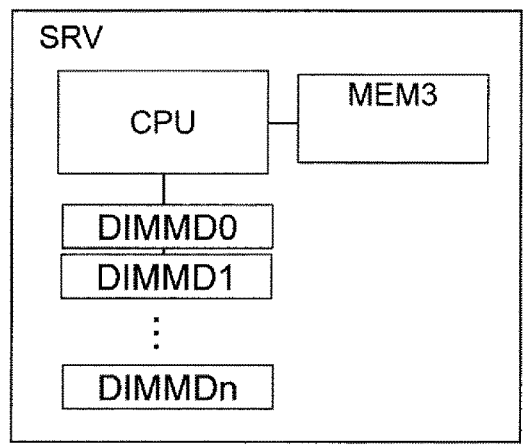
FIGS. 12(A) and 12(B) are block diagrams illustrating exemplary configurations of an information processing system and a memory module according to a second embodiment.
Figure 12B:
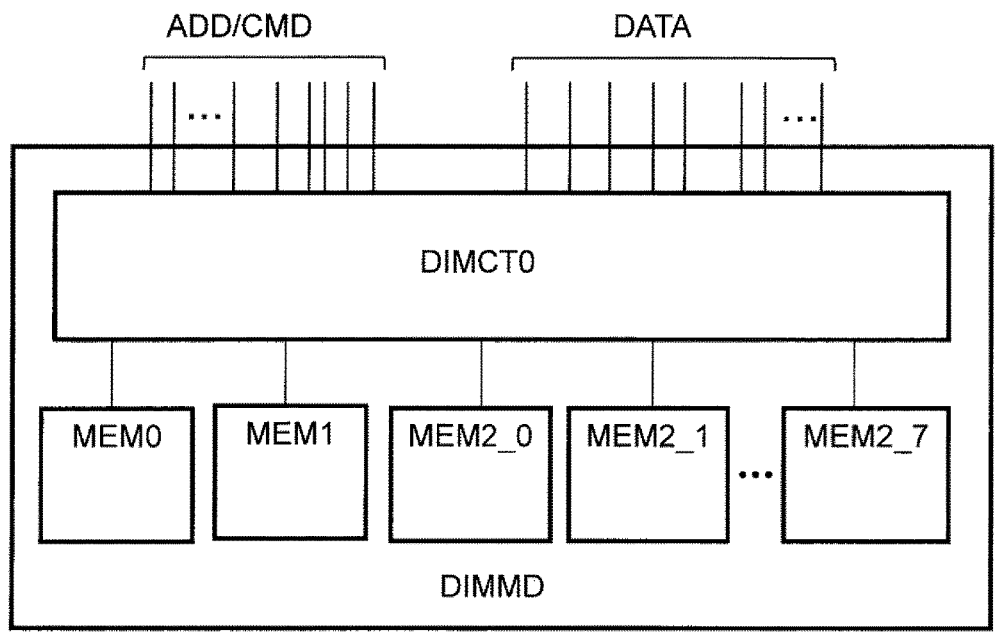

FIGS. 12(A) and 12(B) are block diagrams illustrating exemplary schematic configurations of an information processing system and a memory module according to the present embodiment. An information processing system SRV illustrated in FIG. 12 includes an information processing device CPU, a memory device MEM3, and memory modules DIMMD0 to DIMMDn.

Each of the memory modules DIMMD0 to DIMMDn includes memory devices MEM0, MEM1, and MEM2_0 to MEM2_7, and a control circuit DIMCT0 that controls the memory devices and has a pin arrangement and electrical characteristics specified in a dual inline memory module (DIMM) standard. The information processing device CPU is connected directly with the memory modules DIMMD0 to DIMMDn according to the DIMM standard.

A function and an operation of the control circuit DIMCT0 and the memory devices MEM0, MEM1, and MEM2_0 to MEM2_7 are similar to those in FIG. 1. As the DIMM standard, there are an unbuffered DIMM, a buffered DIMM, and a SO-DIMM, and any one of these standards may be used. The information processing device CPU may be connected directly with the memory modules DIMMD0 to DIMMDn according to the DIMM standard.

The memory modules DIMMD0 to DIMMDn store a large-size database, and the information processing device CPU first transfers a part of the database to the memory device MEM3 while analyzing the part of the database. Temporary data that is being analyzed or an analysis result is stored in the memory device MEM3 or the memory modules DIMMD0 to DIMMDn.

As the memory device MEM3, there are memory devices such as an SRAM, a DRAM, a phase change memory (PCM), a resistive random access memory (ReRAM), a spin transfer torque magnetic random access memory (STT-MRAM), a NAND flash memory, and a NOR flash memory, and any one of these memory devices may be used.

Since the information processing device CPU can be connected directly with the memory modules DIMMD0 to DIMMDn according to the DIMM standard, they can be dealt as a main memory, and thus the large-size database is analyzed at a high speed.

When each memory device constituting the memory modules DIMMD0 to DIMMDn and the memory device MEM3 are non-volatile memories, a high-frequency data holding operation such as a refresh operation in a DRAM is unnecessary, and thus the power consumption of the information processing system SRV is reduced. Further, since it is unnecessary to mount a backup battery for preventing data loss caused by unexpected power shutdown, the cost can be reduced as well.

Third Embodiment

Figure 13:
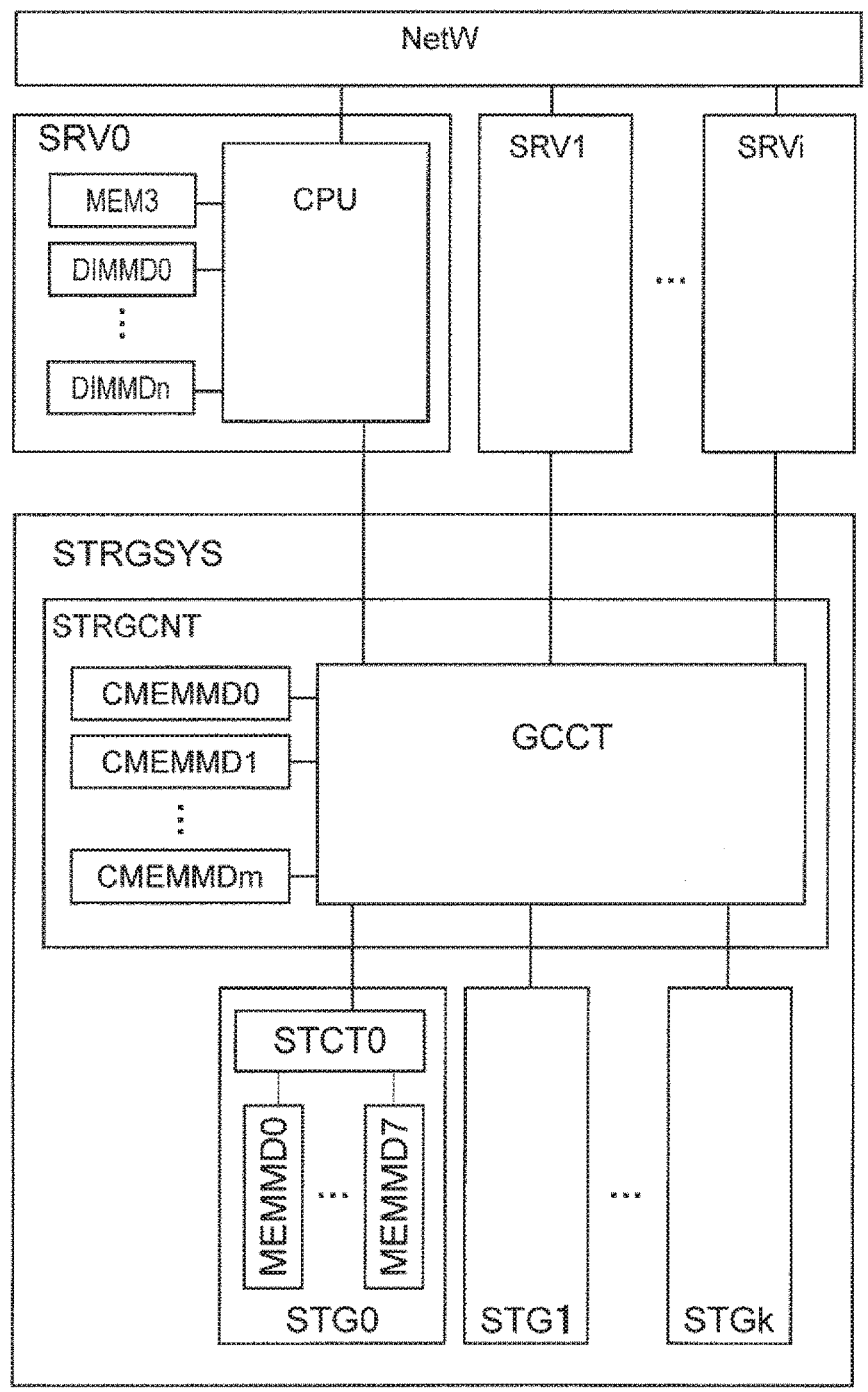
FIG. 13 is a block diagram illustrating an exemplary configuration of an information processing system according to a third embodiment.

FIG. 13 is a block diagram illustrating an exemplary schematic configuration of an information processing system according to the present embodiment. The information processing system illustrated in FIG. 13 includes information processing devices SRV0 to SRVi, a network device NetW that connects the information processing devices SRV0 to SRVi, and a storage system STRGSYS. Each of the information processing devices SRV0 to SRVi has a configuration and a function which are similar to those of the information processing device SRV illustrated in FIG. 12. The storage system STRGSYS includes a storage controller STRGCNT and storage devices STG0 to STGk. The storage controller STRGCNT includes a control device GCCT and memory modules CMEMMD0 to CMEMMDm. Each of the storage devices STG0 to STGk includes a control circuit STCT0 and memory modules MEMMD0 to MEMMDn.

The control circuit STCT0 controls data transfers between the control device GCCT and the memory modules MEMMD0 to MEMMDn. Each of the memory modules MEMMD0 to MEMMDn has a function and a configuration which are similar to those of the memory module MEMMD0 illustrated in FIG. 1.

The control device GCCT in the storage controller STRGCNT controls data transfer among the information processing devices SRV0 to SRVi, the storage devices STG0 to STGk, and the memory modules CMEMMD0 to CMEMMDm. The memory modules CMEMMD0 to CMEMMDm are cache memories of the storage devices STG0 to STGk, and a part of data stored in the storage devices STG0 to STGk is stored in the memory modules CMEMMD0 to CMEMMDm.

Further, the memory modules DIMMD0 to DIMMDn in the information processing devices SRV0 to SRVi are cache memories of the memory modules CMEMMD0 to CMEMMDm, and a part of data stored in the memory modules CMEMMD0 to CMEMMDm is stored in the memory modules DIMMD0 to DIMMDn.

A supergiant database necessary for a stock market, electronic commerce transactions, or the like is stored in the storage devices STG0 to STGk, and an operation of analyzing the supergiant database through the information processing devices SRV0 to SRVi will be described.

When there is data to be analyzed by the information processing device SRV0 in the memory modules DIMMD0 to DIMMDn, the information processing device CPU reads the data from the memory modules DIMMD0 to DIMMDn, analyzes the data, and stores an analysis result in the memory modules DIMMD0 to DIMMDn.

If there is no data DATA0 to be analyzed by the information processing device SRV0 in the memory modules DIMMD0 to DIMMDn, the information processing device CPU in the information processing device SRV0 transfers a read request for the data DAT0 which is necessary to the other information processing devices SRV1 to SRVi that share information through the network device NetW.

When the data DATA0 is stored in any one of the information processing devices SRV1 to SRVi other than the information processing device SRV0, the data DATA0 is transferred to the information processing device SRV0, but when there is no data DATA0, information indicating the "absence of data" is transferred to the information processing device SRV0.

Further, when there is no data DATA0 to be analyzed by the information processing device SRV0 in any of the information processing devices SRV0 to SRVi, the information processing device SRV0 transmits the read request for the data DAT0 which is necessary to the control device GCCT.

The control device GCCT first checks whether or not the data DATA0 is stored in the memory modules CMEMMD0 to CMEMMDm. When the data DATA0 is stored in the memory modules CMEMMD0 to CMEMMDm, the control device GCCT reads the data DAT0 from the memory modules CMEMMD0 to CMEMMDm, and transfers the read data DATA0 to the information processing device SRV0. The information processing device CPU in the information processing device SRV0 analyzes the data DAT0 while storing the data DAT0 in the memory modules DIMMD0 to DIMMDn.

Further, when the data DATA0 is not stored in the memory modules CMEMMD0 to CMEMMDm, the control device GCCT transmits the read request for the data DAT0 to any one of the storage devices STG0 to STGk. The control circuit STCT0 of the storage device that has received the read request for the data DAT0 reads the data DAT0 from the memory module MEMMD0 to MEMMDm and transmits the data DAT0 to the control device GCCT.

Then, the control device GCCT transfers the received data DATA0 to the information processing device SRV0 while storing the memory modules DIMMD0 to DIMMDn.

When the information processing device SRV0 receives the data DATA0, the information processing device CPU in the information processing device SRV0 analyzes the data DATA0 while storing the data DATA0 in the memory modules DIMMD0 to DIMMDn. Further, in order to perform new analysis at a high speed using an analysis result, the analysis result is stored in the memory modules DIMMD0 to DIMMDn in the information processing device SRV0.

When the data size of the analysis result or the like written in the memory modules DIMMD0 to DIMMDn in the information processing device SRV0 is increased, and thus it is unable to store all of analysis result data WDATA3 in the memory modules DIMMD0 to DIMMDn, the information processing device CPU in the information processing device SRV0 makes an empty region in the memory modules DIMMD0 to DIMMDn by transferring the oldest analysis result data WDATA10 in the memory modules DIMMD0 to DIMMDn to a write-back buffer in the information processing device CPU. Then, the information processing device CPU stores the data WDATA3 in the empty region.

Then, the information processing device CPU transmits the write request for the data WDATA10 transferred to the write-back buffer in the information processing device CPU and the data WDATA10 to the control device GCCT.

The control device GCCT checks whether or not there is an empty region in a write region of the memory modules CMEMMD0 to CMEMMDm, and writes the analysis result data WDATA10 in the memory modules CMEMMD0 to CMEMMDm when there is an empty region.

However, when there is no empty region, the control device GCCT makes an empty region in the memory modules CMEMMD0 to CMEMMDm by transferring the oldest analysis result data WDATA50 in the memory modules CMEMMD0 to CMEMMDm to the write-back buffer in the control device GCCT. Then, the control device GCCT writes the data WDATA50 in the empty region in the memory module CMEMMD0 to CMEMMD.

Further, the control device GCCT transmits the write request for the data WDATA50 transferred to the write-back buffer in the control device GCCT and the data WDATA50 to any one of the storage devices STG0 to STGk. The control circuit STCT0 of the storage device that has received the data WDATA50 and the write request writes the data WDATA50 in the memory modules MEMMD0 to MEMMDm.

As described above, the information processing device CPU and the memory modules DIMMD0 to DIMMDn in the information processing devices SRV0 to SRVi can be connected directly with each other according to the DIMM standard, and they can be dealt as a main memory, and thus the information processing system in which the large-size database is analyzed at a high speed can be constructed.

Further, when the memory devices constituting the memory modules DIMMD0 to DIMMDn, CMEMMD0 to CMEMMDm, and MEMMD0 to MEMMDm and the memory device MEM3 are the non-volatile memories, a high-frequency data holding operation such as a refresh operation in a DRAM is unnecessary, and thus the power consumption of the information processing system SRV is reduced. Further, since it is unnecessary to mount a backup battery for preventing data loss caused by unexpected power shutdown, the cost can be reduced as well.

(Brief Description of Representative Effects According to Embodiments)

The representative effects obtained by the above-described embodiments will be briefly described below.

Firstly, a memory module includes a first memory device, a second memory device, a third memory device, and a controller that controls the first to third memory devices, an address translation table related to the second memory device is stored in the first memory device, an address translation table related to the third memory device is stored in the second memory device, and the controller performs the wear leveling for the third memory device and the wear leveling for the second memory device that stores the address translation table related to the third memory device, and thus it is possible to completely cope with power shutdown without damaging the lifespan of the memory module, and in the memory module employing the memories and an information processing system including the memory module, reliability can be improved, and the long lifespan can be implemented.

Secondly, when the memory devices MEM1_0 to MEM1_3 can perform writing in data units of 1 B, the address translation table F-LPT can translate the logical address LAD into the physical address GP-PAD theoretically in data units of 1 B through the address translation table P-GLPT, but the capacity of the address translation table P-GLPT is explosively increased. In this regard, by performing translation from the logical address U-LAD into the physical address GP-PAD, for example, in data size units of 8 KB even in the memory device in which writing can be performed in data units of 1 B, it is possible to significantly reduce a capacity necessary for the address translation table P-GLPT and reduce the cost of the memory module MEMMD0.

For example, when the memory devices MEM1_0 to MEM1_3 have page sizes of various data units such as 512 B, 4 KB, 8 kB, and 16 kB, and data is written, by performing translation from logical address U-LAD into the physical address GP-PAD in data size units of page sizes, it is possible to significantly reduce a capacity necessary for the address translation table P-GLPT and reduce the cost of the memory module MEMMD0.

Thirdly, when the read request is input from the information processing device CPU_CP to the memory module MEMMD0, the following operations (1) to (4) are performed as the pipeline operation, and thus data can be read at a high speed:

(1) extraction of the logical address U-LAD, the logical address M-LAD and the logical address S-LAD from the logical address LAD of the read request;

(2) reading of the physical address GP-PAD of the address translation table F-LPT corresponding to the logical address U-LAD in the address translation table P-GLPT;

(3) reading of the physical address GP-PAD and the physical address F-PAD stored in the physical address P-PAD designated by the logical address M-LAD in the address translation table F-LPT; and (4) reading of data from the physical address F-PAD.

Fourthly, when the write request is input from the information processing device CPU_CP to the memory module MEMMD0, the following operations (1) to (6) are performed as the pipeline operation, and thus data can be written at a high speed:

(1) writing of data to the write buffers WBUF0 and WBUF1;

(2) writing of data to the devices MEM2_0 to MEM2_255;

(3) extraction of the logical address U-LAD, the logical address M-LAD and the logical address S-LAD from the logical address LAD of the write request;

(4) reading of the physical address GP-PAD corresponding to the value of the logical address U-LAD in the address translation table P-GLPT;

(5) update of the address translation tables P-GLPT and F-LPT; and (6) decision of the physical address F-PAD for next writing.

Fifthly, for the wear leveling for the address translation table F-LPT, the wear leveling of the physical addresses GP-PAD of the address translation table F-LPT is combined with the wear leveling of the physical P-PAD in the physical address GP-PAD, and thus the long lifespan of the memory module MEMMD0 can be implemented.

Sixthly, the memory module is configured to support the DIMM standard and thus can be connected directly with the information processing device CPU, and thus the large-size database can be analyzed at a high speed.

The embodiments of the invention made by the inventors have been specifically described, but the present invention is not limited to the above embodiments, and various modifications can be made within the scope not departing from the gist thereof.

REFERENCE SIGNS LIST

CPU_CP, CPU information processing device
MEMMD0, CMEMMD0, DIMMD0 memory module
HDH_IF interface signal
MEM0 memory device
MEM10 to MEM13 memory device
ME2_0 to MEM2_255 memory device
MDCT0 control circuit
DIMCT0 control circuit
RSTSIG reset signal
REF_CLK reference clock signal
HOST_IF interface circuit HOST_IF
BUF0 to BUF3 buffer BUF0 to BUF3
NXNTBL, NXPTBL writing physical address table
ARB arbitration circuit
MANAGER information processing circuit
MAPREG map register
M0CT0, M1CT0, MDCT0 to M2CT31 memory control circuit
RSDCFG register
SRV0 to SRV0 information processing device
NetW network device
STRGSYS storage system
STG0 to STGk storage device
STRGCNT storage controller
GCCT, STCT0 control device

The invention claimed is:

1. A memory module, comprising:
a first memory device that is volatile or non-volatile;
a second memory device that is non-volatile;
a third memory device that is non-volatile; and
a controller that controls the first to third memory devices,
wherein a capacity of the second memory device is larger than a capacity of the first memory device, and a capacity of the third memory device is larger than the capacity of the second memory device,
a second upper limit value of the number of rewritings of the second memory device is larger than a third upper limit value of the number of rewritings of the third memory device, and a first upper limit value of the number of rewritings of the first memory device is larger than the second upper limit value of the number of rewritings of the second memory device, and
the controller accesses the second memory device with reference to a first address translation table related to the second memory device stored in the first memory device, and accesses the third memory device with reference to a second address translation table related to the third memory device stored in the second memory device.

2. The memory module according to claim 1, wherein the first memory device includes a write buffer.

3. The memory module according to claim 2, wherein the controller stores a physical address of the third memory device in the write buffer in advance.

4. The memory module according to claim 3, wherein the controller performs writing of data to the first memory device, decision of the physical address of the third memory device, writing of data to the third memory device, and updating of the second address translation table through a pipeline process.

5. The memory module according to claim 1, wherein a first number-of-rewritings table of the second memory device is stored in the first memory device, and a second number-of-rewritings table of the third memory device is stored in the second memory device.

6. The memory module according to claim 5, wherein the controller performs wear leveling for the second memory device using the first number-of-rewritings table, and performs wear leveling for the third memory device using the second number-of-rewritings table.

7. The memory module according to claim 1, wherein a third number-of-rewritings table of the third memory device is registered in the second address translation table.

8. The memory module according to claim 7, wherein the controller performs wear leveling for the second address translation table using the third number-of-rewritings table.

9. The memory module according to claim 8, wherein the controller performs wear leveling for the second address translation table using the second number-of-rewritings table of the second memory device and the third number-of-rewritings table.

10. The memory module according to claim 1, wherein an offset for a physical address of the second memory device is set in the first address translation table.

11. The memory module according to claim 1,
wherein the second memory device is either of a rewritable memory device and a memory device in which data is written after an erasure operation, and the third memory device is either of a rewritable memory device and a memory device in which data is written after an erasure operation.

12. The memory module according to claim 1,
wherein the memory module has compatibility with a dual inline memory module (DIMM) standard.

13. An information processing system, comprising:
a memory module including a first memory device that is volatile or non-volatile, a second memory device that is non-volatile, a third memory device that is non-volatile, and a controller that controls the first to third memory devices,
an information processing device that is connected with the memory module; and
a memory device that is connected with the information processing device,
wherein a capacity of the second memory device is larger than a capacity of the first memory device, and a capacity of the third memory device is larger than the capacity of the second memory device,
a second upper limit value of the number of rewritings of the second memory device is larger than a third upper limit value of the number of rewritings of the third memory device, and a first upper limit value of the number of rewritings of the first memory device is larger than the second upper limit value of the number of rewritings of the second memory device, and
the controller accesses the second memory device with reference to a first address translation table related to the second memory device stored in the first memory device, and accesses the third memory device with reference to a second address translation table related to the third memory device stored in the second memory device.

14. An information processing system, comprising:
a plurality of first memory modules each of which includes a first memory device that is volatile or non-volatile, a second memory device that is non-volatile, a third memory device that is non-volatile, and a first controller that controls the first to third memory devices;
a plurality of second memory modules including a second controller that controls the plurality of first memory modules; and
a third controller that controls the plurality of second memory modules and a third memory module different from the first memory module, the third memory module having the same configuration as the first memory module,
wherein a capacity of the second memory device is larger than a capacity of the first memory device, and a capacity of the third memory device is larger than the capacity of the second memory device,
a second upper limit value of the number of rewritings of the second memory device is larger than a third upper limit value of the number of rewritings of the third memory device, and a first upper limit value of the number of rewritings of the first memory device is larger than the second upper limit value of the number of rewritings of the second memory device, and
the first controller accesses the second memory device with reference to a first address translation table related to the second memory device stored in the first memory device, and accesses the third memory device with reference to a second address translation table related to the third memory device stored in the second memory device.

15. The information processing system according to claim 14,
wherein the third memory module is a cache memory of the second memory module.

* * * * *